US 6,631,202 B2

(12) United States Patent
Hale

(10) Patent No.: US 6,631,202 B2
(45) Date of Patent: Oct. 7, 2003

(54) METHOD FOR ALIGNING A LATTICE OF POINTS IN RESPONSE TO FEATURES IN A DIGITAL IMAGE

(75) Inventor: Ira David Hale, Englewood, CO (US)

(73) Assignee: Landmark Graphics Corporation, Houston, TX (US)

( * ) Notice: Subject to any disclaimer, the term of this patent is extended or adjusted under 35 U.S.C. 154(b) by 367 days.

(21) Appl. No.: 09/818,220

(22) Filed: Mar. 27, 2001

(65) Prior Publication Data

US 2002/0181751 A1 Dec. 5, 2002

Related U.S. Application Data

(60) Provisional application No. 60/254,347, filed on Dec. 8, 2000.

(51) Int. Cl.[7] .................................. G06K 9/00
(52) U.S. Cl. ........................................ 382/128
(58) Field of Search ....................... 382/128, 131, 382/133, 134, 154, 173; 128/922; 356/39; 345/419, 423, 427

(56) References Cited

U.S. PATENT DOCUMENTS

| 4,908,781 | A | | 3/1990 | Levinthal et al. | |
|---|---|---|---|---|---|
| 5,596,511 | A | | 1/1997 | Toyoda et al. | |
| 5,859,645 | A | | 1/1999 | Latham | |
| 5,898,793 | A | * | 4/1999 | Karron et al. | 382/131 |
| 5,923,777 | A | | 7/1999 | Chun et al. | |
| 6,124,857 | A | | 9/2000 | Itoh et al. | |
| 6,373,998 | B2 | * | 4/2002 | Thirion et al. | 382/294 |
| 6,392,647 | B1 | * | 5/2002 | Migdal et al. | 345/423 |

FOREIGN PATENT DOCUMENTS

EP        0 974 936 A2        1/2000

OTHER PUBLICATIONS

Bentley et al. "Data Structures for Range Searching" Computing Surveys, vol. II, No. 4, Dec. 1979, pp 397–409.
Bern et al. "Mesh Generation and Optimal Triangulation" World Scientific, 1995, pp. 1–78.
Bossen et al. "A Pliant Method for Anisotropic Mesh Generation" Proceedings of the 5th International Meshing roundtable, p. 63–74, Sandia, 1996.
Byrd et al, "Representations of Quasi–Newton Matrices and Their Use in Limited Memory Methods" Northwestern University, Technical Report NAM–03, Jun. 1992, revised Jan. 21, 1996.
Cebral et al. "From Medical Images to CFD Meshes" Proceedings of the 8th International Meshing Roundtable, pp. 321–331, Sandia, 1999.
Garrett et al. "Earth Model Synthesis" EAGE 1997, pp. 13–20.
Mello et al. "A Point Creation Strategy for Mesh Generation Using Crystal Lattices as Templates" Proceedings of the 9th International Meshing Roundtable, pp. 253–261, Sandia, 2000.

(List continued on next page.)

*Primary Examiner*—Samir Ahmed
*Assistant Examiner*—Vikkram Bali
(74) *Attorney, Agent, or Firm*—Meyertons Hood Kivlin Kowert & Goetzel, P.C.; Jeffrey C. Hood

(57) ABSTRACT

A system and method for generating a lattice of points that respects features in a digital image. The method comprises a process for initializing the lattice, and a process for optimizing the configuration of that lattice with respect to the image features. The optimization process operates by adjusting points of the lattice to extremize a composite function of the spatial coordinates of the lattice points. The lattice points are interpreted as atoms. Each lattice point contributes a potential function to an atomic potential field. The image represents another potential field. The composite function is a weighted sum of the atomic and image potential fields evaluated at the lattice points.

58 Claims, 21 Drawing Sheets

OTHER PUBLICATIONS

Kenji Shimada "Physically–Based Mesh Generation: Automated Triangulation of Surfaces and Volumes via Bubble Packing" Massachusetts Institute of Technology, 1993.

Shimada et al. "Bubble Mesh: Automated Triangular Meshing of Non–Manifold Geometry by Sphere Packing" Proceedings of the Third Symposium on Solid Modeling and Applications, ACM Press, pp. 409–419, 1995.

ACMD: Yearly Report 1994–95, Applied and Computational Mathematics Division, Mar. 1995, 4 pgs.

Steve Langer, Information Technology Lab, Helpful Hints, Jul. 28, 2000, 6 pages.

Steve Langer, Recent Changes to PPM200F, May 10, 2001, 11 pages.

ACMD: Yearly Report 1995–96, Applied and Computational Mathematics Division, Jun. 1996, 8 pages.

Labelle L. et al. "Computation of Image Representation Based on Active Triangular Meshes Through Geometrical Surface Evolution" Proceedings of the SPIE, Bellingham, VA, US, vol. 3024, No. 2, Feb. 1997, pp. 843–854 XP000700348 and abstract.

Shimada K. et al. "Bubble Mesh: Automated Triangular Meshing of Non–Manifold Geometry by Sphere Packing" Proceedings of the Third Symposium on Solid Modeling and Applications, Salt Lake City, May 17–29, 1995, Proceedings of the Symposium on Solid Modeling and Applications, NY, ACM, US, vol. SYMP 3, May 17, 1995, pp. 409–419, XP000530140, ISBN: 0–89791–672–7, abstract; figures 3, 4, 5, sections 3.1–3.5.

International Search Report, Application No. PCT/US01/48239, mailed Jul. 5, 2002.

International Search Report, Application No. PCT/US01/48239, mailed Jul. 5, 2002.

* cited by examiner

METHOD FOR ALIGNING A LATTICE OF POINTS IN RESPONSE TO FEATURES IN A DIGITAL IMAGE

CROSS-REFERENCE TO RELATED APPLICATIONS

This application claims the benefit of U.S. Provisional Application No. 60/254,347 filed on Dec. 8, 2000 entitled "Method for Aligning a Lattice of Points with Features in a Digital Image" invented by Ira David Hale.

BACKGROUND

1. Field of the Invention

This invention relates to the analysis of digital images, specifically to the construction of computational meshes from such images.

2. Description of the Prior Art

Digital images are often analyzed to obtain meshes for further computation. For example, seismic images are analyzed to obtain geologic meshes used to simulate oil flowing in subsurface reservoirs. Similarly, medical images of the human brain are analyzed to obtain meshes used to simulate blood flow in arteries. A somewhat different example is image morphing, in which meshes derived from one image may be used to encode efficiently differences in subsequent images. In all of these applications, an image is analyzed to construct a mesh.

Images and Meshing Today

Specifically, such applications often consist of the following sequence of steps:

(1) Process an image to enhance features of interest.
(2) Find curves or surfaces in the image that bound regions of interest.
(3) Fill the space defined by those regions with a computational mesh.
(4) Simulate some process on the space-filling mesh.

For an application in medical imaging, see, Cebral, J. R., and Löhner, R., From Medical Images to CFD Meshes, Proceedings of the 8th International Meshing Roundtable, p. 321–331, Sandia, 1999. For an application in seismic imaging, see, Garrett, S., Griesbach, S., Johnson, D., Jones, D., Lo, M., Orr, W., and Sword, C., Earth Model Synthesis, First Break, v. 15, no. 1, p. 13–20, 1997.

For various reasons, each step in this sequence is today often taken independently, with little regard for the requirements of subsequent steps. For example, it is common in step (2) to produce a bounding curve or surface with more detail than can be represented in the space-filling mesh used in step (4). Seismic reflections representing geologic interfaces are routinely mapped with higher resolution than can practically be used in meshes for petroleum reservoir simulation. This leads to the "scale up" or "upscaling" problem cited by Garrett et al. (1997).

This discrepancy in resolution is often accompanied by a discrepancy in data structure. For example, a two-dimensional (2-D) curve represented by a simple linked list of line segments in step (2) may become a relatively complex mesh of triangles in step (3). Such discrepancies today disrupt the analysis sequence, and may yield inconsistencies between the image processed in step (1) and the mesh used in step (4) that are difficult to quantify.

The disruptions are costly. In the example of seismic image analysis, one iteration of this sequence today may require months of work. This high cost makes it difficult to perform multiple iterations in an attempt to estimate uncertainties in analysis results.

One reason for discrepancies in resolution and data structure lies in the implementation of the analysis sequence. Historically, the four steps listed above may have been performed by separate computer programs, developed independently, and used by different specialists. Today, a single person or small group may perform all four steps in this sequence, and there exists demand for the steps to be more integrated.

Another reason for discrepancies is a lack of methodology. The simulation step (4) often requires the numerical solution of partial differential equations (PDEs). In the past, these solutions were feasible for only structured meshes, in which mesh elements can be indexed as simple arrays. The conversion of an unstructured mesh produced in step (3) to a structured mesh yields additional inconsistencies between the processed image and the mesh used in simulation. However, recent advances in numerical methods for solving PDEs on unstructured meshes suggest that this conversion and resulting inconsistencies can be avoided.

Meshing with Lattices

The accuracy of most computations performed on meshes depends on the regularity of mesh elements. Simulations performed on highly regular triangular meshes, those with nearly equilateral triangles, are more accurate than those performed on irregular meshes with long thin triangles.

This is one reason that the Delaunay triangulation is popular. Given a set of points representing the locations of nodes for a 2-D mesh, the Delaunay triangulation of those points, when compared with all other possible triangulations, yields triangles most nearly equilateral. However, Delaunay triangulation alone does not guarantee a regular mesh. For that, one must choose carefully the locations of the mesh nodes.

(For a survey of 2-D and 3-D Delaunay triangulation applied to the problem of meshing, see Bern, M., and Eppstein, D., Mesh Generation and Optimal Triangulation, in Computing in Euclidean Geometry, Du, D. -Z. and Hwang., F. K. eds., World Scientific, 1995.)

Outside the domain of image analysis, the problem of choosing optimal mesh node locations has been well studied. One solution to this problem is based on the observation that the triangulation of a set of points defined by a simple crystal lattice yields a highly regular mesh. (See Mello, U. T., and Cavalcanti, P. R., A Point Creation Strategy for Mesh Generation Using Crystal Lattices as Templates, Proceedings of the 9th International Meshing Roundtable, p. 253–261, Sandia, 2000.) However, a uniform lattice of points can seldom be aligned exactly with the boundaries of objects to be meshed. Therefore, some solutions begin with an approximately uniform lattice, and then use numerical models of physical forces between atoms or bubbles to automatically move mesh nodes (atoms or bubbles) to more optimal locations. (See Shimada, K., Physically-Based Mesh Generation: Automated Triangulation of Surfaces and Volumes via Bubble Packing, Ph.D. thesis, Massachusetts Institute of Technology, 1993, and Shimada, K., and Gossard, D. C., Bubble Mesh: Automated Triangular Meshing of Non-Manifold Geometry by Sphere Packing, in Proceedings of the Third Symposium on Solid Modeling and Applications, p. 409–419, 1995. U.S. Pat. No. 6,124,857, to Itoh, T., Inoue, K., Yamada, A., and Shimada, K., Meshing Method and Apparatus, 2000, extends this work to quadrilateral meshing. See also Bossen, F. J., and Heckbert, P. S., A Pliant Method for Anisotropic Mesh Generation, Proceedings of the 5th International Meshing Roundtable, p. 63–74, Sandia, 1996.)

In all of these examples, lattice-based meshing begins with a geometric model that defines precisely the internal and external boundaries of objects to be meshed. Thus, there exists a need for a meshing system and methodology capable of addressing problems where such boundaries may not be known a-priori.

U.S. Patents Cited in this Specification

U.S. Pat. No. 4,908,781, to Levinthal, C., and Fine, R., Computing Device for Calculating Energy and Pairwise Central Forces of Particle Interactions, 1990.

U.S. Pat. No. 5,596,511, to Toyoda, S., Ikeda, H, Hashimoto, E., and Miyakawa, N., Computing Method and Apparatus for a Many-Body Problem, 1997.

U.S. Pat. No. 6,124,857, to Itoh, T., Inoue, K., Yamada, A., and Shimada, K., Meshing Method and Apparatus, 2000.

Other References Cited in this Specification

Bentley, J. L., and Friedman, J. H., Data Structures for Range Searching, Computing Surveys, vol. 11, no. 4, 1979.

Bern, M., and Eppstein, D., Mesh Generation and Optimal Triangulation, in Computing in Euclidean Geometry, Du, D. -Z. and Hwang., F. K. eds., World Scientific, 1995.

Bossen, F. J., and Heckbert, P. S., A Pliant Method for Anisotropic Mesh Generation, Proceedings of the 5th International Meshing Roundtable, p. 63–74, Sandia, 1996.

Byrd, R. H., Nocedal, J., and Schnabel, R. B., Representations of Quasi-Newton Matrices and Their Use in Limited Memory Methods, Technical Report NAM-03, Northwestern University, Department of Electrical Engineering and Computer Science, 1996.

Cebral, J. R., and Löhner, R., From Medical Images to CFD Meshes, Proceedings of the 8th International Meshing Roundtable, p. 321–331, Sandia, 1999.

Garrett, S., Griesbach, S., Johnson, D., Jones, D., Lo, M., Orr, W., and Sword, C., Earth Model Synthesis, First Break, v. 15, no. 1, p. 13–20, 1997.

Mello, U. T., and Cavalcanti, P. R., A Point Creation Strategy for Mesh Generation Using Crystal Lattices as Templates, Proceedings of the 9th International Meshing Roundtable, p. 253–261, Sandia, 2000.

Shimada, K., Physically-Based Mesh Generation: Automated Triangulation of Surfaces and Volumes via Bubble Packing, Ph.D. thesis, Massachusetts Institute of Technology, 1993.

Shimada, K., and Gossard, D. C., Bubble Mesh: Automated Triangular Meshing of Non-Manifold Geometry by Sphere Packing: Proceedings of the Third Symposium on Solid Modeling and Applications, ACM Press, p. 409–419, 1995.

SUMMARY OF THE INVENTION

In accordance with various embodiments of this invention, a method for generating a lattice of points which respects features in a digital image comprises a process for initializing a lattice, and a process for optimizing the alignment of that lattice with respect to the image features. The optimization process operates by adjusting points of the lattice to extremize a composite function of the spatial coordinates of the lattice points. The composite function may be a weighted combination of a first function of pair-wise distances between the points, and a second function derived from the image (e.g., computed from sampled values of the image near the lattice points).

A mesh may be generated from the optimized lattice. The mesh may be used in any of a variety of applications. For example, the mesh may be used to simulate a process associated with the image. As another example, the mesh may be used to compress the image or subsequent images in an image sequence (e.g. a video stream).

In some embodiments, the optimized lattice may be used to encode information associated with the image with or without the generation of an intermediate mesh. Any of various types of associated information are contemplated.

Objects and Advantages

One object of at least some embodiments of this invention is a method that enables one to replace the image analysis sequence described above (in the description of the prior art) with the more efficient sequence:

(1) Process an image to enhance features of interest.

(2) Fill space with a computational mesh aligned with image features.

(3) Simulate some process on the space-filling mesh.

Instead of finding boundaries of regions within images and then meshing those regions, one simply constructs a mesh that is aligned with the boundaries.

Additional objects of some embodiments of this invention are the use of this method to construct:

highly regular meshes, suitable for further computations, such as the solution of partial differential equations; and graded meshes, in which the density of mesh nodes varies with image complexity or a user-specified function; and 3-D meshes, where 3-D images are available.

These and other objects and advantages of various embodiments of the invention will become apparent from consideration of the following description and drawings.

Figure 1:
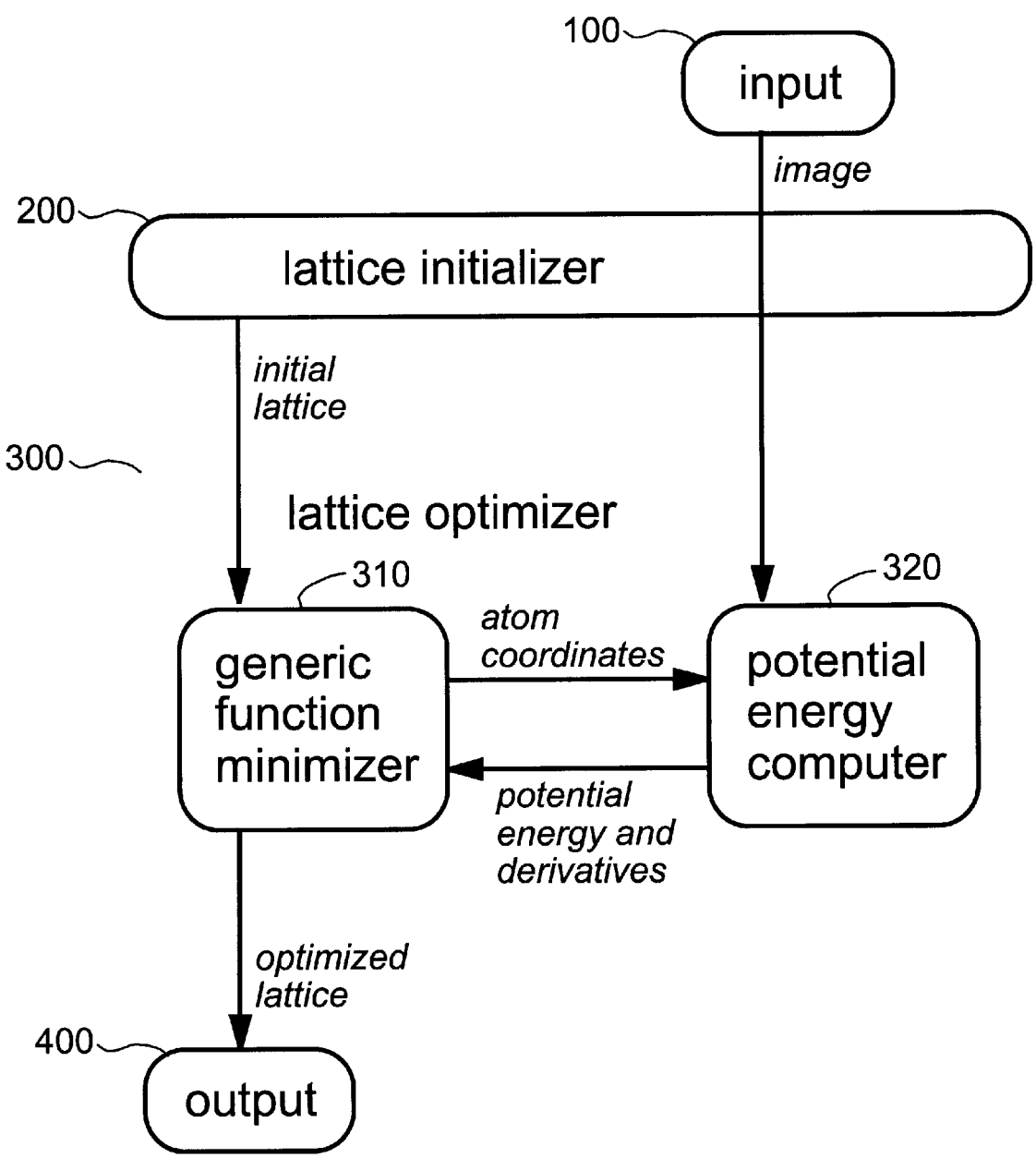
FIG. 1: the flow of data among the primary components in the method of this invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

A method for generating a lattice of points which respects features in a digital image is described herein. The method comprises initializing and then optimizing the lattice of points. In one set of embodiments, the points of the optimized lattice tend to be aligned on (coincident with) features in the image. In a second set of embodiments, the points of the optimized lattice tend to be aligned alongside, but not on, features in the image. In other embodiments, the optimized lattice points may tend to be aligned on some features and not aligned with other features in the same image.

Hereafter, we refer to points in the lattice as atoms. We describe the process of lattice initialization in terms of the atomic structures of crystals. Likewise, we describe lattice optimization in terms of minimizing the potential energy of an atomic lattice. These physical models make our description easier to understand, but an atom in the context of this invention is merely a point.

FIG. 1 illustrates in more detail the flow of data among the primary components of this method. A data input component 100 produces an image that has been processed elsewhere to highlight features of interest. Here, the image is either obtained directly as a result of that processing or loaded from a computer memory. A lattice initializer 200 creates an initial lattice of atoms that spans the image. A lattice optimizer 300 moves the atoms so that the lattice is aligned with features in the image. The data output component 400 consumes the optimized lattice of atoms, either passing it to some other process or storing it in a computer memory.

The lattice optimizer 300 comprises a generic function minimizer 310 and a potential energy computer 320. The generic minimizer 310 iteratively searches for a minimum of a function of many variables. During its search, the minimizer requires repeated evaluations of the function and its partial derivative with respect to each variable. Here, the variables are the spatial coordinates of atoms in a lattice. Given atom coordinates and an image, the potential energy computer 320 evaluates the lattice potential energy and its partial derivative with respect to each atom coordinate.

Computing the Potential Energy

An atom in a two-dimensional (2-D) space has x and y coordinates, and an atom in a three-dimensional (3-D) space has x, y, and z coordinates. The vector x denotes the x and y (or x, y and z) spatial coordinates of a point in 2-D (or 3-D) space. Given two atoms with locations $x_i$ and $x_j$, $|x_i - x_j|$ denotes the distance between them. In the preferred embodiment, the vector norm $|\cdot|$ used to compute this inter-atomic distance is the Euclidean norm. However, any of a variety of other norms may be used instead.

Pair-wise Potential Functions

For computational efficiency, we model the interaction among atoms with a simple pair-wise force function, so that the total force exerted on an atom by its neighbors is simply the sum of the forces exerted by each one of them. Even with this simplification, there exist many reasonable choices for the pair-wise force function.

To avoid having two or more atoms with the same, or nearly the same, coordinates, the force between them may be repulsive (positive) if they are too close to each other. Likewise, to prevent large empty spaces with no atoms, the force between two atoms may be attractive (negative) if they are too far away from each other. To facilitate numerical computations, the force may be bounded. To prevent every atom in the lattice from exerting a force on every other atom, the force may be zero beyond a cutoff distance. Furthermore, the force function may be continuous as a function of the inter-atomic distance. The force function proposed by Shimada (1993) has these properties. Thus, in one set of embodiments, we use Shimada's force function, as described below. However, any of a variety of force functions consistent with these properties may be employed.

Let d denote the nominal distance between two atoms, the distance at which the force goes from being repulsive to being attractive. Then, the force $f$ between two atoms located at $x_i$ and $x_j$ may be given by the cubic polynomial:

$$f(u) \equiv \begin{cases} \frac{9}{8} - \frac{19}{8}u^2 + \frac{5}{4}u^3, & 0 \leq u < \frac{3}{2}, \\ 0, & \frac{3}{2} \leq u, \end{cases}$$

where u is the normalized distance between the two atoms defined by $$u \equiv \frac{|x_i - x_j|}{d}.$$

Figure 2A:
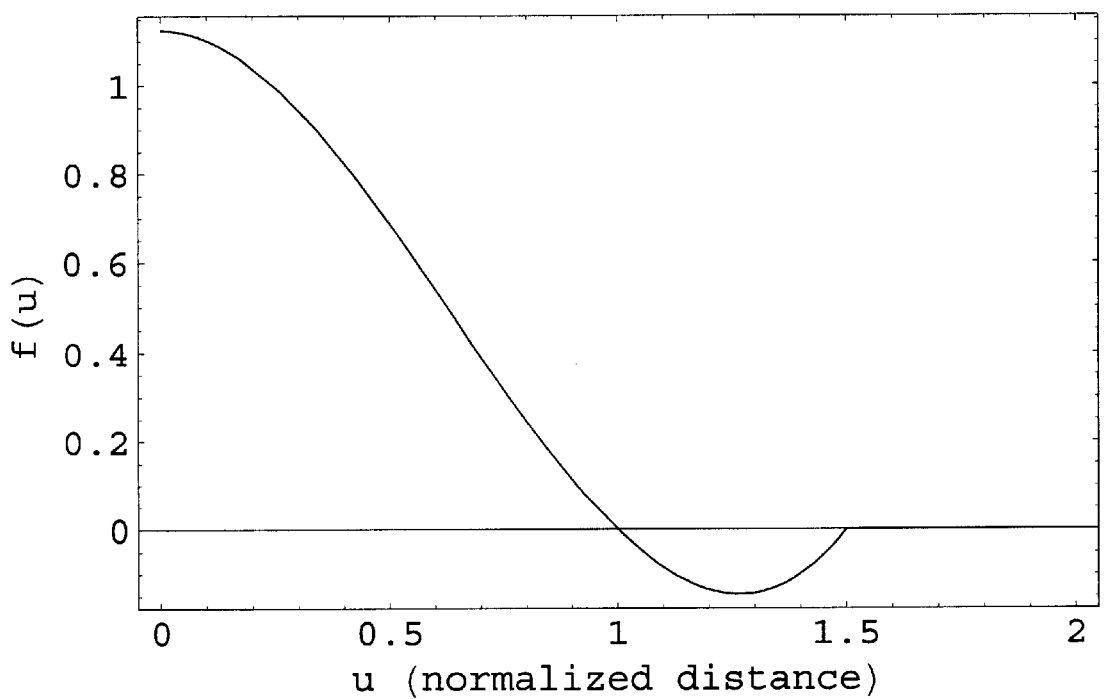
FIG. 2: the pair-wise (a) force and (b) potential functions of normalized distance between any two atoms.

The coefficients of this polynomial function ensure that the force is bounded and continuous, that it equals zero at u=1 and $u \geq 3/2$, and that it is positive for $0 \leq u < 1$ and negative for $1 < u < 3/2$. FIG. 2a illustrates this force function.

Generally, the force on an atom is a vector. Here, the direction of this vector is implied by the sign of $f(u)$, and by the locations $x_i$ and $x_j$ of the two atoms.

It is more convenient to work with a scalar potential than with the multiple components of a vector force. Therefore, following a well-known convention, we define the force to be the negative of the gradient of a scalar potential:

$$\phi(u) \equiv \begin{cases} \frac{153}{256} - \frac{9}{8}u + \frac{19}{24}u^3 - \frac{5}{16}u^4, & 0 \leq u < \frac{3}{2}, \\ 0, & \frac{3}{2} \leq u. \end{cases}$$

Figure 2B:
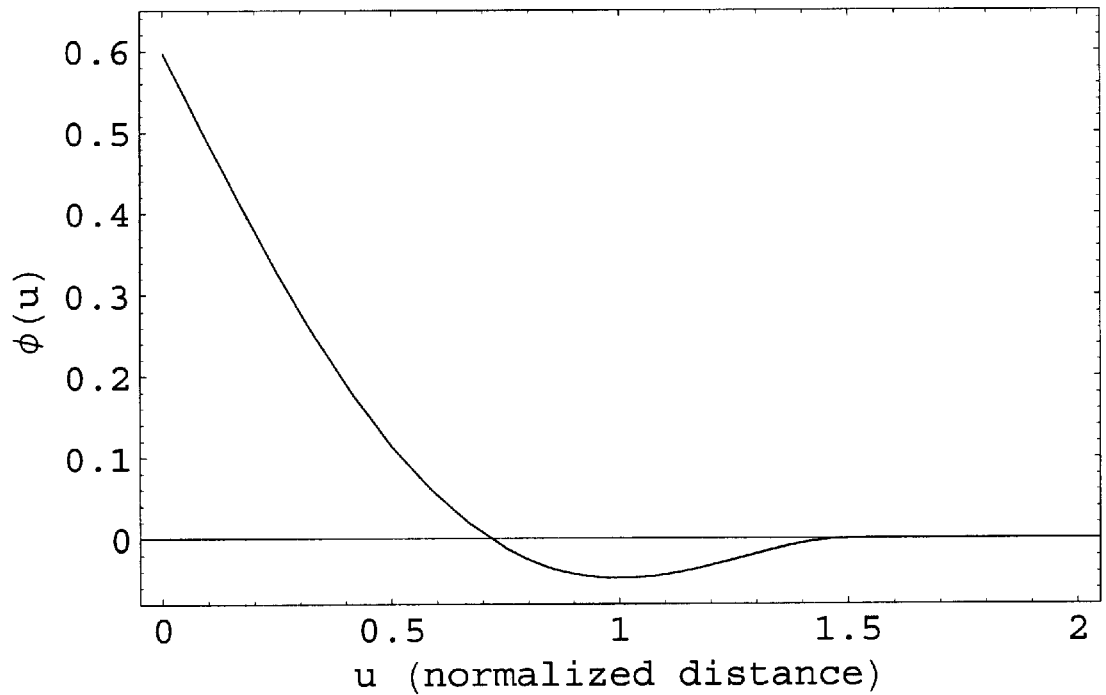

The constant of integration $153/256$ has been chosen so that $\phi(u)$ is continuous at u=3/2. FIG. 2b illustrates this potential function. As expected, the potential function $\phi(u)$ has a minimum at normalized distance $u=1$, where the force function $f(u)$ is zero.

Potential Energies and Potential Fields

Given a potential function $\phi(u)$ of normalized distance u, we define the atomic potential energy to be the following sum of pair-wise potentials:

$$A = A(x_1, x_2, \ldots, x_n) \equiv \frac{1}{2}\sum_{i=1}^{n}\sum_{j=1}^{n}\phi\left[\frac{|x_i - x_j|}{d(x_j)}\right], \quad (1)$$

where $x_1, x_2, \ldots, x_n$ are the coordinates of n atoms in a lattice, and $d(x)$ is the nominal inter-atomic distance function of position x. The nominal distance function $d(x)$ need not be constant; but, to ensure a smoothly graded lattice, we require that it be smooth. Specifically, we require that $|\nabla d|<<1$, so that $d(x_i) \approx d(x_j)$ for $|x_i-x_j|/d$ less than the cutoff distance $3/2$ of the potential function $\phi(u)$. Then, the factor $1/2$ compensates for the appearance of $\phi[|x_i-x_j|/d(x_j)] \approx \phi[|x_j-x_i|/d(x_i)]$ twice in the definition of the total potential energy A.

We may also define the atomic potential energy A in terms of an atomic potential field:

$$a(x) \equiv \sum_{j=1}^{n}\phi\left[\frac{|x - x_j|}{d(x_j)}\right], \text{ so that} \quad (2)$$

$$A = A(x_1, x_2, \ldots, x_n) \equiv \frac{1}{2}\sum_{i=1}^{n}a(x_i).$$

In other words, the atomic potential energy is defined to be half the sum of values obtained by evaluating the atomic potential field at the atom coordinates.

Likewise, we define an image potential energy $$B = B(x_1, x_2, \ldots, x_n) \equiv \sum_{i=1}^{n}b(x_i), \quad (3)$$

where $b(x)$ is an image potential field based on the input image.

In many contexts, an image potential field is simply an image (or a smoothed version of an image), typically represented by a 2-D (or 3-D) array of numbers stored in a computer memory. Here, we use the term "potential field" to emphasize (and later exploit) the similarity between the atomic and image potential fields.

In one set of embodiments, it is assumed that the image has been processed so that the image potential field attains a minimum value (e.g., $b(x) \approx -1$) within features of interest, and a maximum value (e.g., $b(x) \approx 0$) in uninteresting regions. In this case, minimimizing the image potential energy B is equivalent to moving atoms into minima corresponding to features of interest in the image.

In a second set of embodiments, it is assumed that the image has been processed so that the image potential field attains a maximum value (e.g., $b(x) \approx 1$) within features of interest, and a minimum value (e.g., $b(x) \approx 0$) in uninteresting regions. In this case, minimimizing the image potential energy B is equivalent to moving atoms away from the maxima corresponding to features of interest in the image.

In a third set of embodiments, the image potential field may attain a maximum value (e.g. $b(x) \approx 1$) along a first subset of the image features, a minimum value (e.g. $b(x) \approx -1$) along a second subset of the image features, and an intermediate value (e.g. $b(x) \approx 0$) away from the image features.

More generally, we move atoms to minimize the following weighted sum of the atomic and image potential energies:

$$P = P(x_1, x_2, \ldots, x_n) \equiv (1-\beta)A + \beta B \quad (4)$$

which we call the total potential energy. The scale factor $\beta$ determines the relative contributions of A and B to the total potential energy P. When $\beta=0$, atoms tend toward a perfectly regular lattice that is not aligned with the image. When $\beta=1$, atoms are sensitive to only image sample values; i.e., atoms move only on the basis of their attraction to minima in the image and/or their repulsion from maxima in the image. Thus, atoms tend to congregate in the minima and vacate the maxima in the image, yielding a highly irregular lattice. Typically, we choose $\beta \approx 1/2$, and obtain a lattice that is approximately regular and respects image features.

In terms of the potential fields $a(x)$ and $b(x)$, the total potential energy is $$P = \sum_{i=1}^{n}\frac{1}{2}(1-\beta)a(x_i) + \beta b(x_i).$$

In terms of the total potential field, defined as $$p(x) \equiv (1-\beta)a(x) + \beta b(x), \quad (5)$$

the total potential energy is $$P = \frac{1}{2}\sum_{i=1}^{n}p(x_i) + \beta b(x_i). \quad (6)$$

Like the nominal distance function $d(x)$, the scale factor $\beta$ in equations (5) and (6) may be a smoothly varying function of position x. (As for $d(x)$, smoothness implies that derivatives of $\beta(x)$ are negligible.) This generalization enables the balance between lattice regularity and sensitivity to (e.g., attraction to or repulsion from) image features to vary spatially. Sensitivity of the lattice to image features may be more important in one part of the image than in some other part. For simplicity here, we let $\beta$ denote a constant scale factor.

The total potential energy P is a non-quadratic function of the atom coordinates $x_1, x_2, \ldots, x_n$, with many local minima. (For example, note that interchanging the coordinates of any two atoms does not change P.) Therefore any search for a minimum, usually one close to the initial lattice coordinates, must be iterative. In an efficient iterative search, we must evaluate repeatedly partial derivatives of P with respect to the atom coordinates. Consider, for example, the change in P with respect to the x-coordinate of the i'th atom:

$$\frac{\partial P}{\partial x_i} = (1-\beta)\frac{\partial A}{\partial x_i} + \beta\frac{\partial B}{\partial x_i}. \quad (7)$$

In evaluating the partial derivative $\partial A/\partial x_i$ of the atomic potential energy, we recall that the term $\phi[|x_i-x_j|/d(x_j)] \approx \phi[|x_j-x_i|/d(x_i)]$ appears twice in the double sum of equation (1). Therefore, $$\frac{\partial A}{\partial x_i} = \sum_{j=1}^{n} \phi'\left[\frac{|x_i - x_j|}{d(x_j)}\right] \frac{1}{d(x_j)} \frac{x_i - x_j}{|x_i - x_j|} \quad (8)$$

$$= \frac{\partial a}{\partial x}(x_i)$$

$$\frac{\partial B}{\partial x_i} = \frac{\partial b}{\partial x}(x_i) \quad (9)$$

$$\frac{\partial P}{\partial x_i} = \frac{\partial p}{\partial x}(x_i). \quad (10)$$

Similar results may be obtained easily for partial derivatives with respect to the y (and, in 3-D, the z) coordinate of each atom.

Computation

Computation of the total potential energy P requires the computation of its components A and B. To compute the image potential energy B according to equation (3), we must evaluate the image potential field b(x) for each atom location $x=x_i$. Images are typically sampled uniformly, and the simplest and most efficient approximation to $b(x_i)$ is the value of the image potential field b(x) at the image sample nearest to the point $x_i$. More accurate approximations (interpolations) are possible, but we used this simple and fast nearest-neighbor interpolation in all of the examples shown here. Equation (3) implies that the cost (the computational complexity) of computing B is O(n), where n is the number of atoms.

In contrast, the double sum in equation (1) implies that the cost of the most straight-forward method for computing A is $O(n^2)$. In practical applications, n is large enough that an $O(n^2)$ cost for computing A would be much greater than the O(n) cost of evaluating B. To reduce the cost of computing A, we may exploit our design of the potential function ø(u), which is zero for normalized distances u greater than the cutoff distance ³⁄₂. Only the atoms nearest to an atom located at position $x=x_i$ contribute to the atomic potential field $a(x_i)$ at that position.

This observation leads to the problem of determining which atom neighbors are within a distance $\frac{3}{2}d(x_i)$ of each atom located at $x=x_i$. Solution of this problem is non-trivial, because atoms move repeatedly during optimization of the lattice.

For example, if we construct lists of neighboring atoms, one list for each atom, we must update these lists (or at least check to see whether they require updating) whenever atoms move. For lattices with near constant density, the cost of constructing and updating such lists using simple data structures is O(mn), where m is the average number of neighbor atoms within the cutoff distance. For variable-density lattices, more complex data structures are required and the cost becomes O(mn log n). (See, for example, Bentley, J. L., and Friedman, J. H., Data Structures for Range Searching, Computing Surveys, vol. 11, no. 4, 1979. See, also, U.S. Pat. No. 4,908,781, to Levinthal, C., and Fine, R., Computing Device for Calculating Energy and Pairwise Central Forces of Particle Interactions, 1990, and U.S. Pat. No. 5,596,511, to Toyoda, S., Ikeda, H, Hashimoto, E., and Miyakawa, N., Computing Method and Apparatus for a Many-Body Problem, 1997.)

Our expression of the atomic potential energy A in terms of the atomic potential field (x) suggests a simpler solution. We interpret equation (2) as a recipe for computing an atomic potential field a(x) that is sampled like the image potential field b(x). Specifically, we represent a(x) with a 2-D or 3-D array having the same dimensions as the array used to represent the image b(x). We first initialize a(x) to zero for all x sampled. Then, for each atom located at position $x=x_j$, we accumulate a sampled potential function $\phi[|x-x_j|/d(x_j)]$. This accumulation is limited spatially to samples inside the circle (or sphere) of radius $\frac{3}{2}d(x_j)$ centered at position $x_j$, where the contribution of the sampled potential function is non-zero.

Figure 3A:
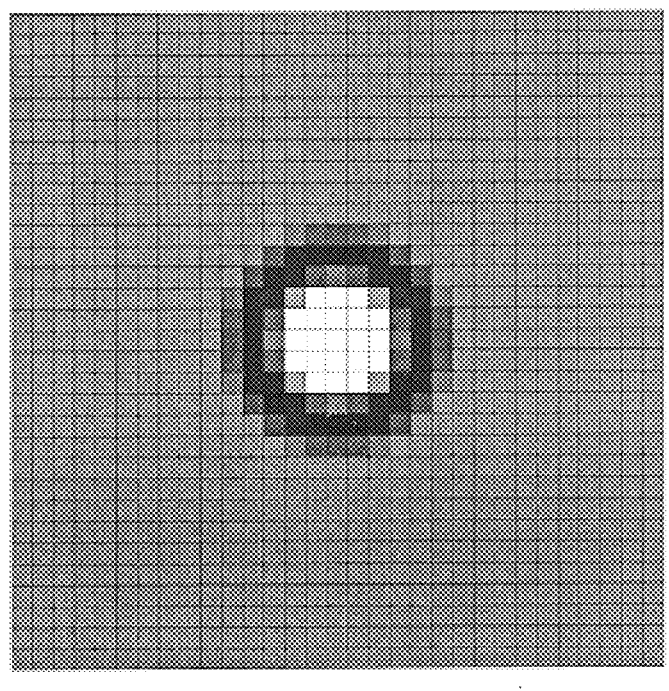
FIG. 3: the contributions, for nominal distances (a) 4 and (b) 8, of one atom to a sampled atomic potential field.
Figure 3B:
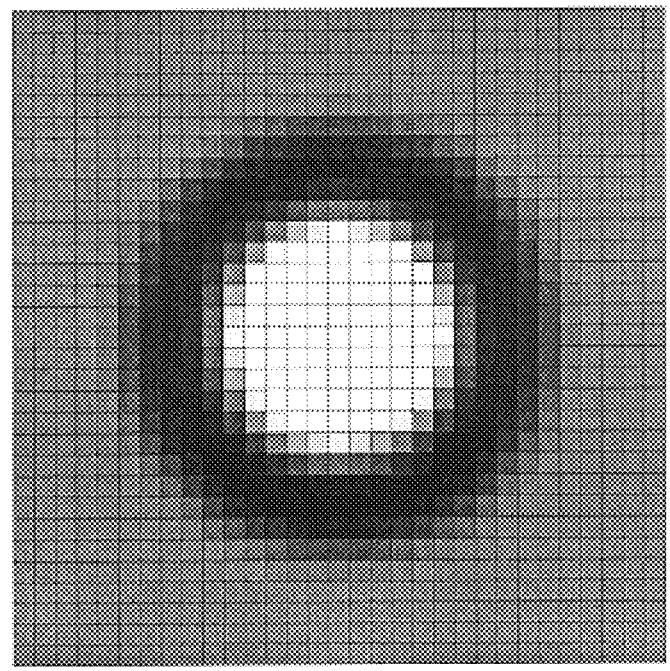

FIGS. 3a and 3b illustrate two such potential functions, for nominal distances d=4 and d=8, respectively. Gray levels between black and white correspond to sampled function values between −0.05 and 0.05, respectively. The atomic potential field a(x) is simply the accumulation of many such functions. For computational efficiency, these sampled potential functions may be pre-computed and tabulated for different nominal distances d. Then, given d(x) for any location x, the appropriate values of the potential function may be determined efficiently by table lookup (or table lookup and interpolation).

Preferred Embodiment

Our analysis suggests two quite different algorithms for computing the total potential energy and its partial derivatives. The preferred embodiment of this invention uses equations (2) and (5) to compute the total potential field p(x), and then uses equation (6) to compute the total potential energy, and equation (10) to compute its partial derivatives. The following pseudo-code listing describes this algorithm in detail.

ALGORITHM 1: COMPUTE $P$, $\frac{\partial P}{\partial x_i}$, $\frac{\partial P}{\partial y_i}$, AND $\frac{\partial P}{\partial z_i}$ 101: initialize total potential field $p(x) = \beta b(x)$ 102: for all atom locations $x_j = x_1, x_2, \ldots, x_n\{$ 103:    for all $x$ such the $|x - x_j| < \frac{3}{2}d(x_j)\{$ 104:      accumulate $p(x) = p(x) + (1 - \beta)\phi[|x - x_j|/d(x_j)]$

105:    }

106: }

107: initialize total potential energy $P = 0$

108: for all atom locations $x_i = x_1, x_2, \ldots, x_n\{$

109:    accumulate $P = P + \frac{1}{2}[p(x_i) + \beta b(x_i)]$

110:    compute $\frac{\partial P}{\partial x_i} = \frac{1}{2}[p(x_i + 1, y_i, z_i) - p(x_i - 1, y_i, z_i)]$ 111:    compute $\frac{\partial P}{\partial y_i} = \frac{1}{2}[p(x_i, y_i + 1, z_i) - p(x_i, y_i - 1, z_i)]$ 112:    compute $\frac{\partial P}{\partial z_i} = \frac{1}{2}[p(x_i, y_i, z_i + 1) - p(x_i, y_i, z_i - 1)]$

113: }

Lines 101 through 106 compute the total potential field p(x), sampled like the image potential field b(x). Given this field, lines 107 through 113 compute the total potential energy P and its partial derivatives $$\frac{\partial P}{\partial x_i}, \frac{\partial P}{\partial y_i}, \text{ and } \frac{\partial P}{\partial z_i}.$$

In line 109, the values of the total potential field and the image potential field at atom location $x_i$ may be approximated as mentioned above, by selection of the corresponding field values at the nearest image sample position, or by any desired interpolation scheme. The partial derivatives in lines 110–112 are computed from the total potential field using simple centered-finite-difference approximations;

however, alternative (e.g., higher-order) numerical approximations to derivatives may be used instead. For definiteness, this listing assumes a 3-D coordinate space. For a 2-D space, one simply ignores the z coordinates and partial derivatives $$\frac{\partial P}{\partial z_i}.$$

Assuming that atom locations are consistent with the nominal distance function d(x), the computational cost of Algorithm 1 is O(N), where N is the number of samples in the image. Recall that we sample the total potential field like the image, and that each atom contributes a spatially-limited potential function (like those in FIG. 3) to those samples in the total potential field that lie nearest to the atom. Therefore, the cost of accumulating the contributions from all atoms is proportional to the number of samples N in the field.

The cost of this algorithm is comparable to that of conventional image processing, and it requires data structures no more complex than the simple array that represents the image. Furthermore, the cost is the same for non-constant nominal distance functions d(x) as for constant nominal distance d.

Alternative Embodiment

An alternative embodiment of this invention does not compute the total potential field. Rather, it uses equations (1), (3), and (4) to compute the total potential energy, and equations (7), (8), and (9) to compute its partial derivatives. The following pseudo-code listing describes this algorithm in detail.

ALGORITHM 2: COMPUTE $P$, $\frac{\partial P}{\partial x_i}$, $\frac{\partial P}{\partial y_i}$, AND $\frac{\partial P}{\partial z_i}$ 201: initialize total potential energy $P = 0$
202: for all atom locations $x_i = x_1, x_2, ..., x_n$ {
203:     accumulate $P = P + \beta b(x_i)$
204:     initialize $\frac{\partial P}{\partial x_i} = \frac{1}{2}\beta[b(x_i+1, y_i, z_i) - b(x_i-1, y_i, z_i)]$
205:     initialize $\frac{\partial P}{\partial y_i} = \frac{1}{2}\beta[b(x_i, y_i+1, z_i) - b(x_i, y_i-1, z_i)]$
206:     initialize $\frac{\partial P}{\partial z_i} = \frac{1}{2}\beta[b(x_i, y_i, z_i+1) - b(x_i, y_i, z_i-1)]$
207:     for all atom locations $x_j$ such that $|x_i - x_j| < \frac{3}{2}d(x_i)$ {
208:        accumulate $P = P + \frac{1}{2}(1-\beta)\phi[|x_i - x_j|/d(x_i)]$
209:        compute $\Delta = (1-\beta)\phi'[|x_i - x_j|/d(x_i)]/[d(x_i)|x_i - x_j|]$
210:        accumulate $\frac{\partial P}{\partial x_i} = \frac{\partial P}{\partial x_i} + \Delta(x_i - x_j)$
211:        accumulate $\frac{\partial P}{\partial y_i} = \frac{\partial P}{\partial y_i} + \Delta(y_i - y_j)$
212:        accumulate $\frac{\partial P}{\partial z_i} = \frac{\partial P}{\partial z_i} + \Delta(z_i - z_j)$
213:     }
214: }

For each atom, line 203 accumulates the image potential energy B and line 208 accumulates the atomic potential energy A for each atom neighbor into the total potential energy P. Likewise, lines 204 through 206 and 210 through 212 accumulate the contributions of the partial derivatives of the image and atomic potential energies to the partial derivatives of the total potential energy.

Line 207 implies the use of an auxiliary data structure that enables atom neighbors nearest to an atom located at $x=x_i$ to be determined quickly. This data structure must be reconstructed or in some way updated whenever atoms move. Atoms move repeatedly in any iterative search for atom coordinates that minimize the total potential energy. Therefore, the cost of maintaining this data structure may be significant. For the most efficient data structures, the cost is higher for non-constant nominal distance functions d(x) than for constant nominal distance d.

Lattice Initialization

As noted above, the total potential energy P is a non-quadratic function of the atom coordinates, with many local minima. During lattice optimization, we move atoms iteratively in search of a minimum. In practice, we neither seek nor find the global minimum. Rather, we find an optimized lattice of atoms that is close to an initial lattice. Therefore, it is desirable that the initial lattice minimize (locally) the atomic potential energy,
be highly regular, and
be consistent with the nominal distance function d(x).

Constant Nominal Distance

Figure 4:
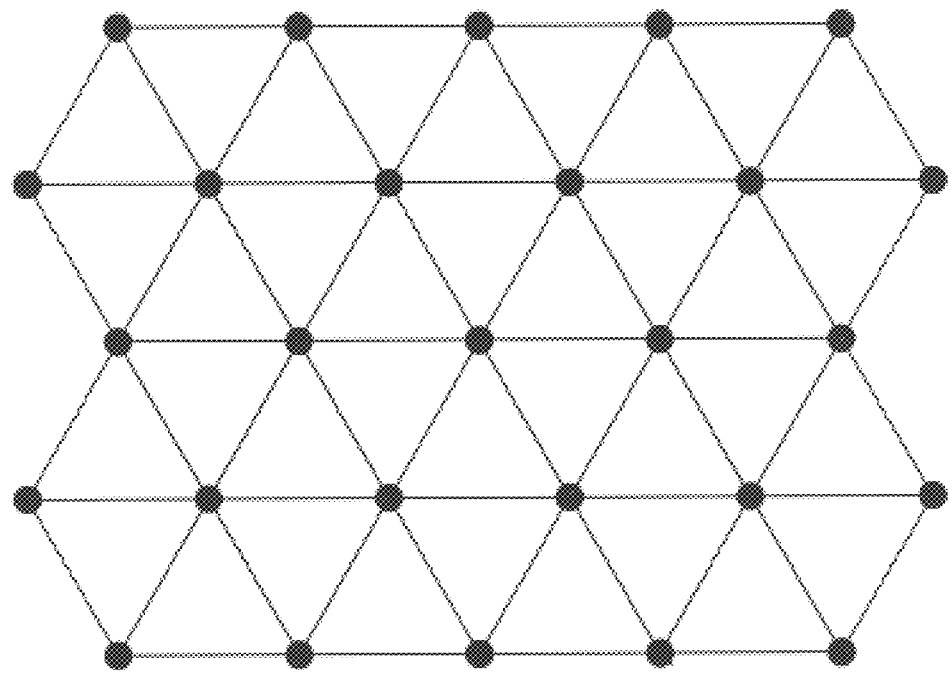
FIG. 4: a hexagonal 2-D lattice of atoms that has been triangulated.

For constant nominal distance d, we can easily construct an initial lattice with these properties. FIG. 4 illustrates such a lattice for a 2-D space. In this ideal lattice, the atoms may be connected to form equilateral triangles. The distance between any atom and its six nearest neighbors is simply the constant nominal distance d. At this distance, the force exerted by any one atom on another is exactly zero, and the atomic potential energy is locally minimized.

Figure 5:
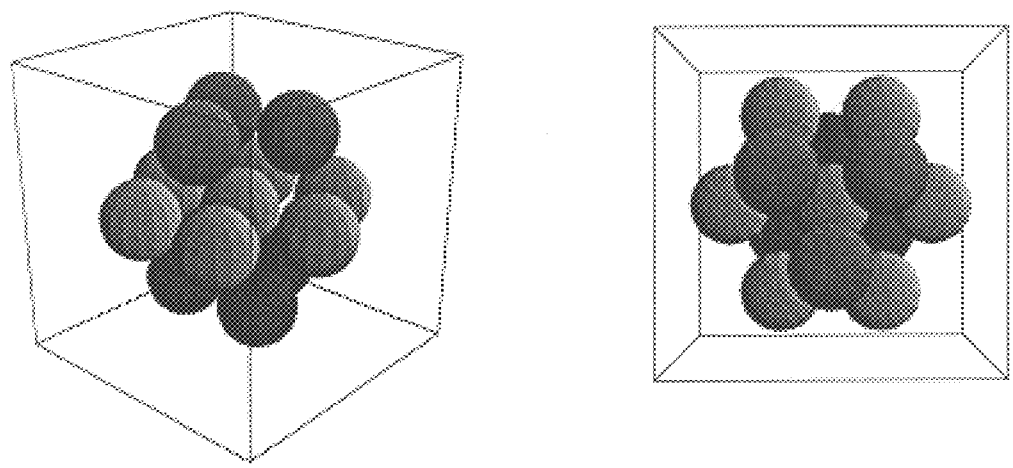
FIG. 5: a face-centered-cubic 3-D lattice of atoms.

FIG. 5 illustrates a regular lattice for a 3-D space. This is a face-centered-cubic (FCC) lattice, in which atoms are arranged in horizontal layers that look like the 2-D lattice of FIG. 4, but with each layer shifted slightly to fill in the holes of the layers above and below. For clarity in FIG. 5, the atoms in different layers are rendered with spheres colored in different shades of gray. The distance between any atom and its twelve nearest neighbors equals the constant nominal distance d.

In contrast to equilateral triangles, which can fill a 2-D space entirely (as in FIG. 4), equilateral tetrahedra cannot fill a 3-D space. Nevertheless, atoms in an FCC lattice can be triangulated to obtain highly regular tetrahedra.

Variable Nominal Distance

The initial arrangement of atoms is more difficult for a non-constant nominal distance function d(x).

Figure 6:
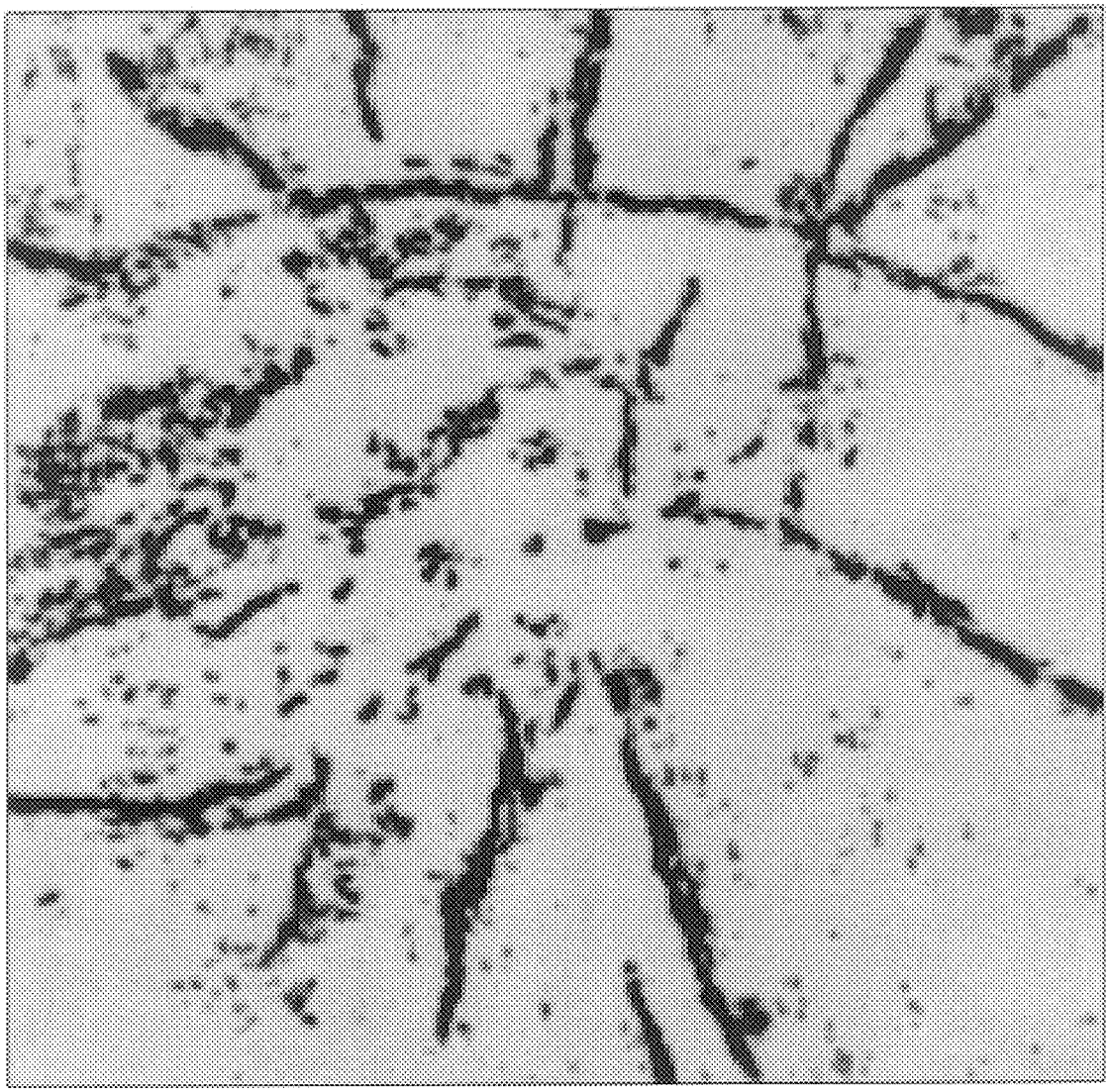
FIG. 6: a seismic image that has been processed to enhance faults, discontinuities in subsurface geology.

The first complication is that the function d(x) must be computed, if not otherwise specified. As an example of how one might compute this function, consider the image (i.e., the image potential field b(x)) displayed in FIG. 6. This image is a horizontal slice through a 3-D seismic image (not shown) that was processed to highlight faults, discontinuities in subsurface geology. The dark linear features in this image represent traces of faults that intersect this horizontal slice. The faults are approximately vertical, almost orthogonal to this horizontal slice.

Figure 7:
FIG. 7: a nominal distance function, which represents the desired variable spacing between atoms in the lattice.

FIG. 7 shows the result of smoothing the seismic image to obtain an estimate of the nominal distance function d(x). The darkest regions in this figure correspond to a minimum distance of d=6 samples, and the lightest regions correspond to a maximum distance of d=18 samples. These minimum and maximum distances were specified explicitly, based on the level of detail we observed in the seismic image. Distances are smaller in the middle-left portion of the image, and larger in the lower-right portion. The average distance is approximately 9.7 samples.

In some applications, the nominal distance function d(x) may be specified explicitly or constructed interactively using a computer program for painting images. With regard to the present invention, the actual manner in which the function d(x) is computed is not important. As stated above, we require only that this function be smooth; i.e., that $|\nabla d|<<1$.

The second complication is that of arranging atoms in a lattice consistent with the nominal distance function d(x). Here, we describe two algorithms for this arrangement.

Preferred Embodiment

The preferred embodiment of this invention uses an algorithm for generating pseudo-regular lattices. The following pseudo-code listing describes this algorithm in detail.

Algorithm 3: Initialize a Pseudo-Regular Lattice

301: initialize an image-like array of boolean flags w(x)=false

302: construct an empty list of atoms

303: construct an empty queue of atom sites

304: append the location $x_i$ of the center of the image to the queue

305: while the queue is not empty {

306: get and remove the first site $x_i$ from the queue

307: if $x_i$ lies within the coordinate bounds of the image {

308: set sphere=spherical region centered at $x_i$ with diameter $\gamma d(x_i)$ 309: if, for all samples inside the sphere, w(x)=false {

310: for all samples inside the sphere, set w(x)=true

311: append an atom with coordinates $x_i$ to the list

312: append ideal sites for atom neighbors to the end of the queue

313: }

314: }

315: }

Figure 8:
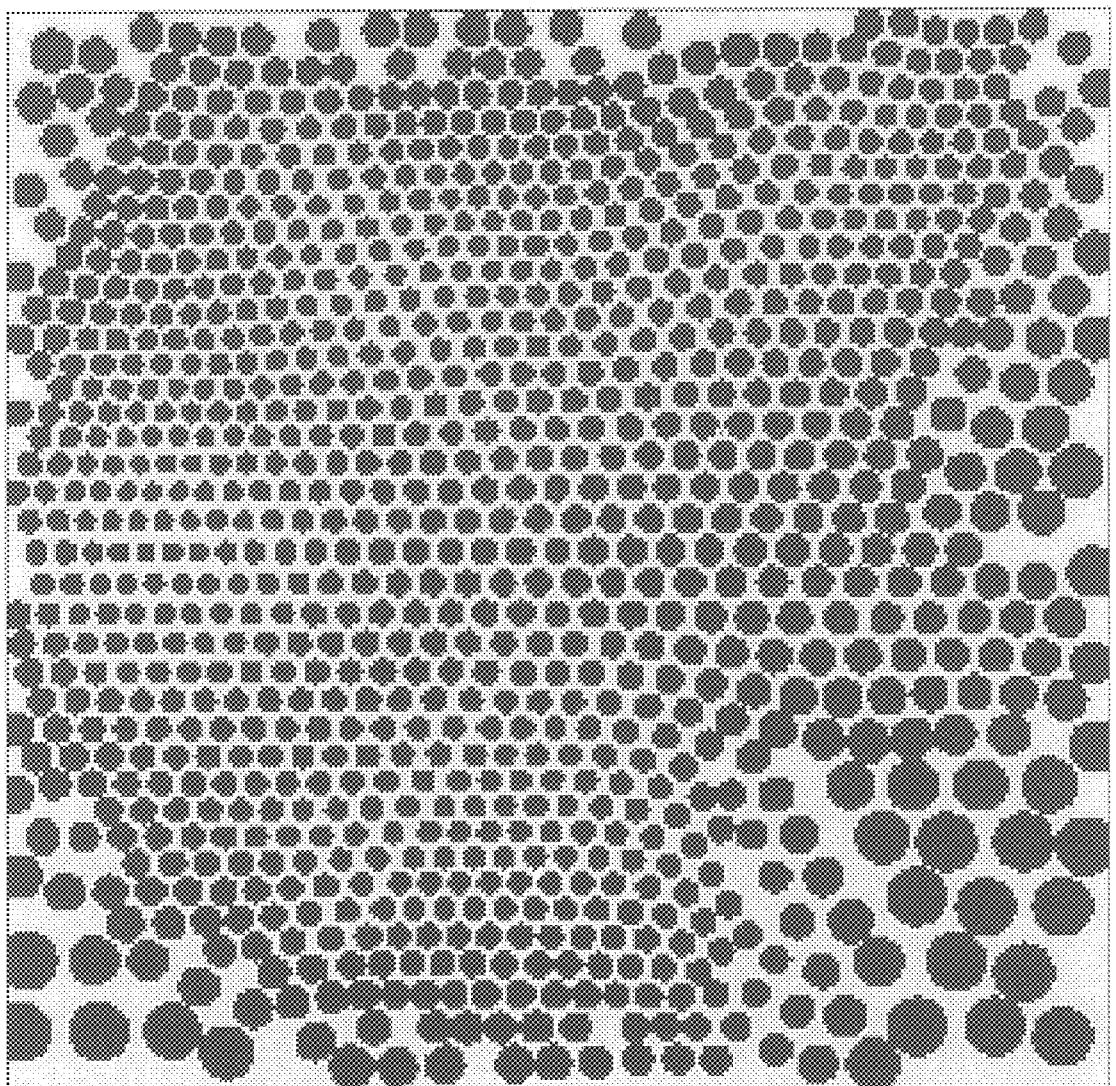
FIG. 8: an initial pseudo-regular distribution of atoms in a lattice; each atom is marked by a circle with diameter proportional to the nominal distance function evaluated at the atom location.

The array w(x) initialized in line 301 is a temporary work array, with dimensions equal to those of the image. Its sole purpose is to mark locations of atoms in the lattice as they are generated by the algorithm. (The test in line 309 ensures that locations so marked will not be marked again.) In the preferred embodiment of this invention, this array can be the same as that used to store the total potential field p(x) in Algorithm 1, so that no additional memory is required. FIG. 8 shows an example of the array w(x), computed for the nominal distance function shown in FIG. 7.

Each circular region in FIG. 8 is centered at an atom location, and has a diameter proportional to the value of the nominal distance function d(x) at that atom location. The constant of proportionality is the factor γ in line 308 of this algorithm. By choosing this factor to be less than one, we permit some atoms in the initial lattice to be closer together than the nominal distance function d(x) implies, knowing that other atoms will be further away. We determined experimentally that the factor γ=0.8 yields pseudo-regular lattices consistent with smooth nominal distance functions d(x).

The ideal sites in line 312 are the locations of atom neighbors in the regular lattices shown in FIGS. 4 and 5. (The distances to these atom neighbors are not scaled by γ.) Therefore, for constant d, Algorithm 3 yields a regular lattice like one of these. For non-constant d(x), it yields a pseudo-regular lattice.

In any case, the processing of ideal sites placed in the queue causes the lattice to grow outward from the first site placed in the queue. Therefore, the first site acts as a seed from which the lattice is grown. Line 304 of Algorithm 3 chooses that first site to be the center of the image. Alternative seed locations may be used. For example, if a mesh for simulation of fluid flow is desired, then the locations of one or more fluid sources may be used to seed the growth of a lattice. As another example, a center-of-mass of features in the image may be selected as the seed location.

Figure 9:
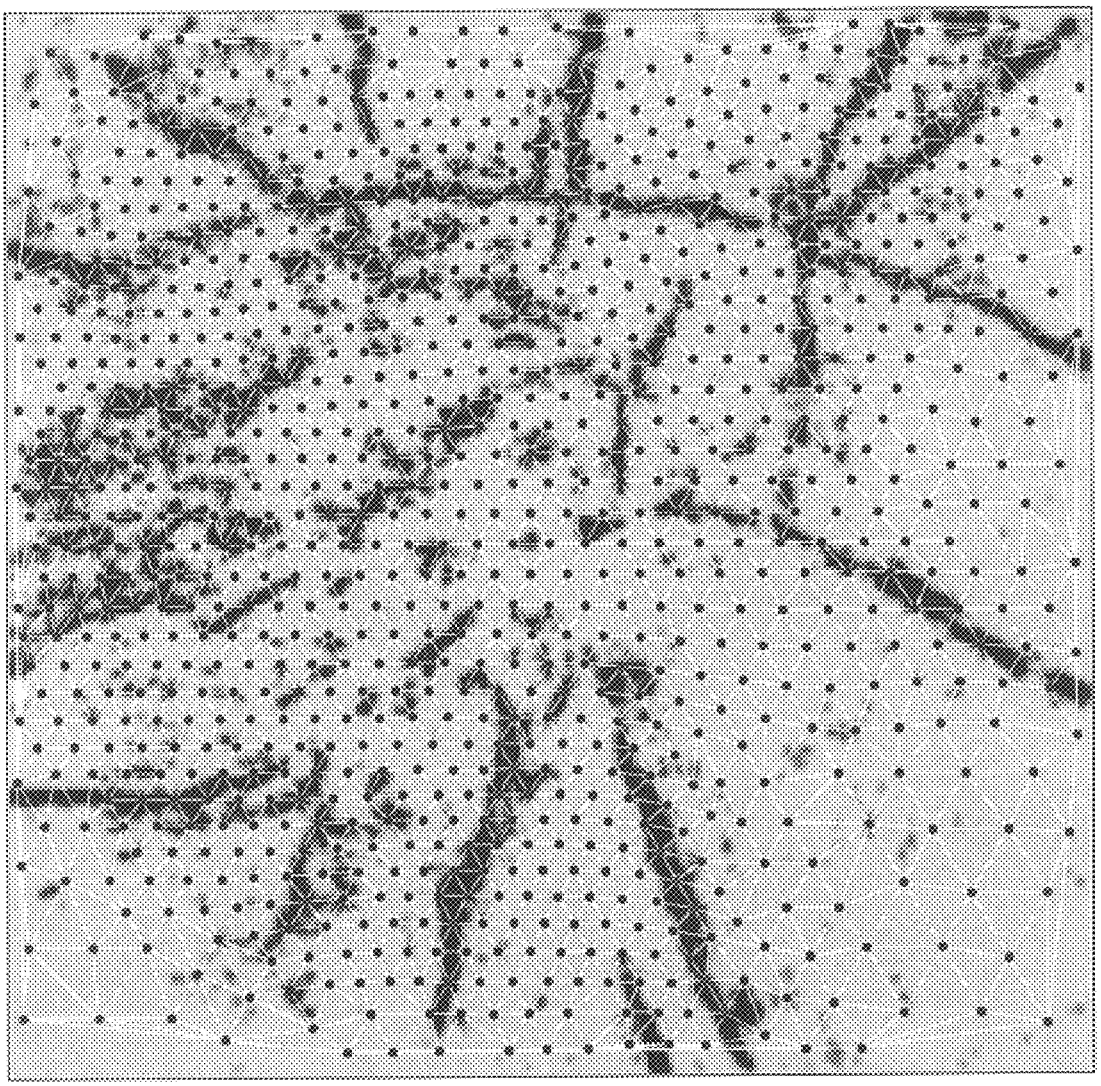
FIG. 9: a mesh corresponding to a pseudo-regular initial lattice for the seismic image.

The mesh shown in FIG. 9 is the Delaunay triangulation of a pseudo-regular initial lattice created using Algorithm 3 and the nominal distance function shown in FIG. 7. While most of the triangles in this mesh of the initial lattice are highly regular, the complete Delaunay triangulation shown here yields some long thin triangles near the convex hull of the lattice points. Such irregular triangles near the mesh boundaries may simply be ignored in subsequent computations.

Alternative Embodiment

An alternative embodiment of this invention uses an entirely different algorithm for generating pseudo-random initial lattices. The following pseudo-code listing describes this algorithm in detail.

Algorithm 4: Initialize a Pseudo-Random Lattice

401: construct an empty list of atoms

402: for all x sampled by the image {

403: set d=d(x)

404: if 2-D, set $\rho=2/\sqrt{3}d^2$

405: if 3-D, set $\rho=2/\sqrt{2}d^3$

406: generate a pseudo-random number r, uniformly distributed in [0:1)

407: if r<ρ, add atom located at x to list

408: }

Line 404 (for 2-D images) or 405 (for 3-D images) of this algorithm computes the nominal lattice density ρ, corresponding to a value of the nominal distance function d(x). In a 2-D space, lattice density is inversely proportional to the distance squared between atoms; in a 3-D space, it is inversely proportional to distance cubed. The constants of proportionality $2/\sqrt{3}$ (line 404) and $2/\sqrt{2}$ (line 405) correspond to the ideal lattices shown in FIGS. 4 and 5, respectively.

Lattice density is the probability that an atom exists at any location sampled by the image. Lines 406 and 407 use a pseudo-random number generator to add an atom to the lattice with that probability. This algorithm uses commonplace computer software for generating a pseudo-random number uniformly distributed in the interval [0:1).

This pseudo-random algorithm is simpler and faster than the pseudo-regular Algorithm 3. It also generates initial lattices that are completely isotropic, with none of the preferred directions or planes of symmetry exhibited by pseudo-regular lattices. Depending on the application, this may or may not be an advantage.

Unfortunately, a pseudo-random initial lattice is highly irregular. Atoms in such a lattice exhibit no geometric pattern, which makes the otherwise useful term "pseudo-random lattice" an oxymoron.

Figure 10:
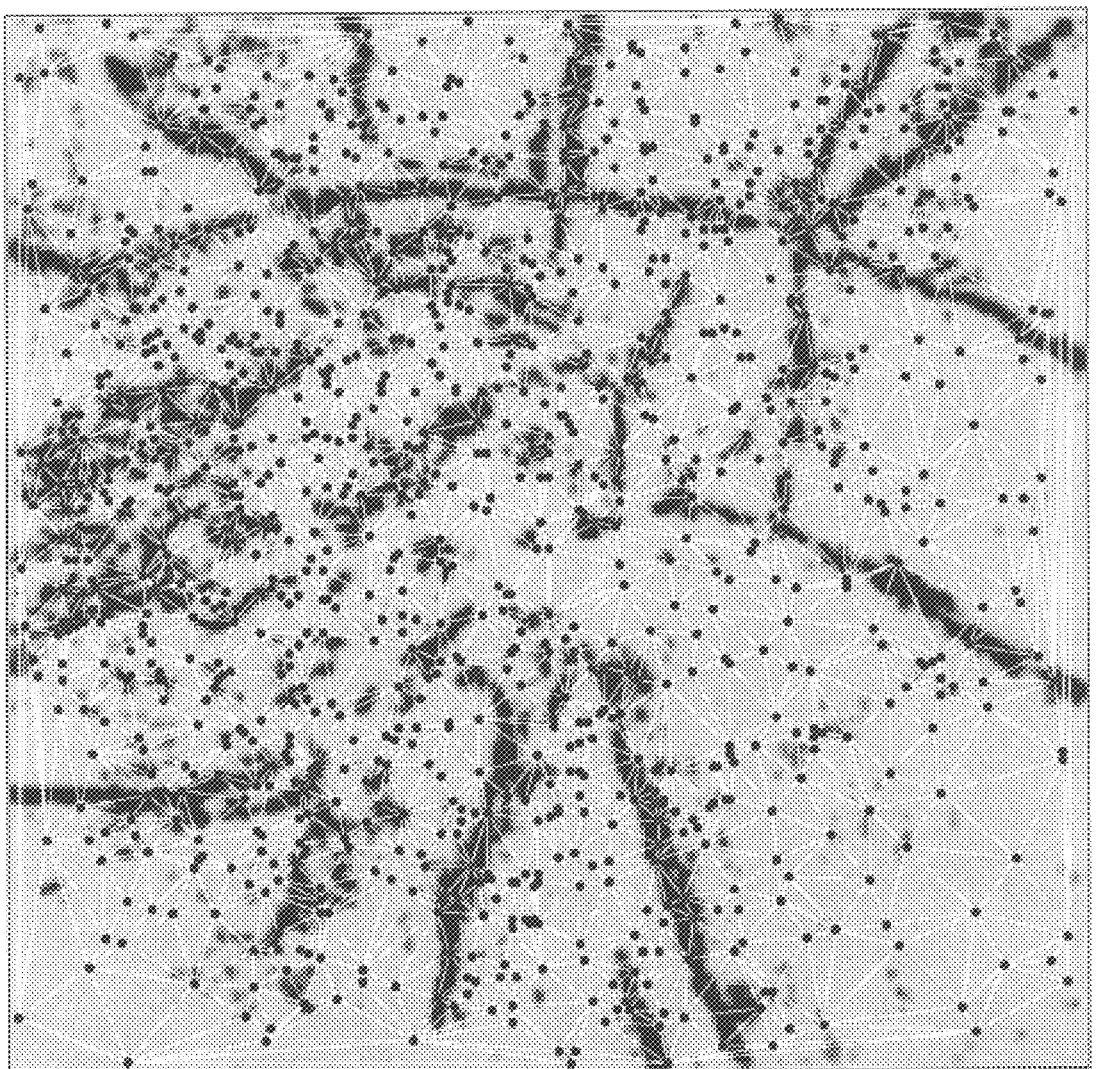
FIG. 10: a mesh corresponding to a pseudo-random initial lattice for the seismic image.

FIG. 10 shows a mesh corresponding to a pseudo-random initial lattice generated for the seismic image, using Algorithm 4. Although this mesh is statistically consistent with the nominal distance function shown in FIG. 7, it is highly irregular, with many triangles that are far from equilateral. Lattice optimization will make this pseudo-random initial lattice more regular, but will require more work (more iterations) than optimization of the pseudo-regular initial lattice shown in FIG. 9.

Lattice Optimization

The lattice optimizer moves atoms in an initial lattice to obtain an optimized lattice. In one set of embodiments, the optimized lattice is both regular and more aligned with image features than the initial lattice. In other words, atoms in the optimized lattice far away from image features tend towards a pseudo-regular structure that respects the nominal distance function, while atoms near image features tend to be coincident with those features. In another set of embodiments, the optimized lattice is both regular and more rarefied along the image features than the initial lattice. The lattice optimizer uses commonplace computer software for minimizing an arbitrary function of many variables. The lattice optimizer applies this software to minimize the lattice total potential energy, which is a function of atom coordinates.

Various choices for the generic function minimizer are possible. In the preferred embodiment, we use the limited-memory Broyden-Fletcher-Goldfarb-Shanno (L-BFGS) minimizer. (See, for example, Byrd, R. H., Nocedal, J., and Schnabel, R. B., Representations of Quasi-Newton Matrices and Their Use in Limited Memory Methods, Technical Report NAM-03, Northwestern University, Department of Electrical Engineering and Computer Science, 1996. Note, particularly, the simple two-loop recursion on page 17.) Like other minimizers, the L-BFGS method iteratively evaluates a function and its partial derivatives, in its search for a minimum.

The L-BFGS minimizer requires more computer memory but fewer function evaluations than the method of conjugate gradients, another well-known method. However, the additional memory required is insignificant when compared with the memory required to represent an image. Furthermore, the cost of each function evaluation (computing the lattice total potential energy) is significantly more costly than the other computations performed by the minimizer. Therefore, the L-BFGS minimizer is well-suited to this invention.

Preferred Embodiment

The preferred embodiment of this invention uses the following algorithm for lattice optimization.

Algorithm 5: Optimize the Lattice

501: get the initial lattice atom coordinates $x_1, x_2, \ldots, x_n$
502: construct a potential energy computer
503: construct a minimizer
504: compute the initial lattice total potential energy P
505: do {
506: set $P_o$=P
507: randomly perturb $x_1, x_2, \ldots, x_n$
508: do {
509: set $P_i$=P
510: let minimizer decrease P by adjusting $x_1, x_2, \ldots, x_n$
511: } while $P_i-P>\epsilon|P_i|$
512: } while $P_o-P>\epsilon|P_o|$ This algorithm begins at line 501 with an initial lattice of atoms, such as the pseudo-regular lattice produced by Algorithm 3 or the pseudo-random lattice generated by Algorithm 4. It then (line 502) constructs a potential energy computer, responsible for computing the total potential energy P and its partial derivatives. It then (line 503) constructs a minimizer, which will use the potential energy computer to minimize P. (Construction of the potential energy computer and the minimizer includes allocation of memory and initialization of a number of variables and tables.) It then (line 504) computes the total potential energy P of the initial lattice.

The remainder of the algorithm comprises two nested loops. The inner loop beginning at line 508 lets the minimizer adjust the atom coordinates $x_1, x_2, \ldots, x_n$ to decrease the total potential energy P. This loop continues until the decrease in P becomes insignificant, as determined by the small threshold $\epsilon$ in line 511. A typical threshold is $\epsilon=0.001$.

Recall that the total potential energy is a function with many local minima. The inner loop begins with the current atom coordinates, and tends toward the minimum nearest to those coordinates. We have observed that this local minimum may have a total potential energy larger than that of another minimum nearby.

The outer loop beginning at line 505 enables the algorithm to move from one local minimum to another one, until the decrease in total potential energy P is insignificant. The random perturbations of atom coordinates in line 507 are small, typically no more than 10% of the nominal distance $d(x_i)$, for each atom location $x_i$. We use a commonplace pseudo-random number generator to compute these perturbations. Subsequent iterations of the inner minimization loop typically yield a significant decrease in total potential energy P.

The inner and outer loops in Algorithm 5 use the same test for convergence. Both loops terminate when the decrease in total potential energy P becomes insignificant. Alternative convergence criteria are commonplace in numerical optimization, and our choices here are not important. For example, one might terminate these loops when the maximum change in atom coordinates is less than some threshold.

Figure 11:
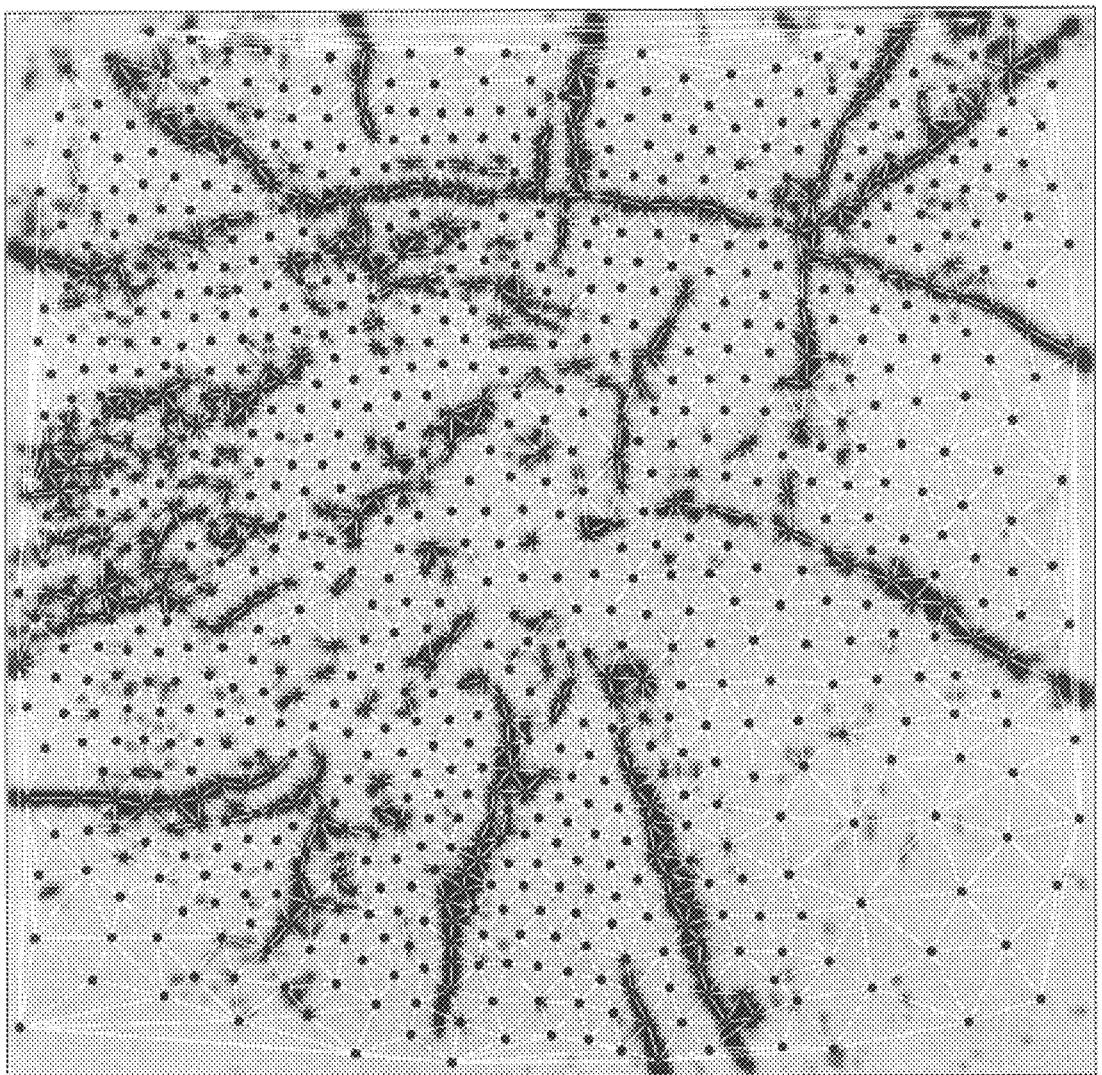
FIG. 11: a mesh corresponding to the optimized lattice for the seismic image.

FIG. 11 shows the result of optimizing the initial pseudo-regular lattice for the seismic image, where the image has been processed to have values near minus one along image features and zero away from image features. Recall equation (4), which states that the total potential energy P is a weighted sum of atomic and image potential energies. In this example, we used an image weight $\beta=0.3$. The resulting optimized lattice is both highly regular (again, ignoring triangles near the convex hull of the lattice points) and well-aligned with image features.

For images with small or narrow features, it may be useful to perform the first few iterations of Algorithm 5 using a slightly smoothed version of the image. These first iterations enable atoms to move towards features that might otherwise be missed, because they are too far away from initial lattice locations. Atoms are attracted initially to the smoothed features, and then, in subsequent iterations, to high-resolution features in the original unsmoothed image.

Curve and Surface Extraction

In a space-filling mesh, curves (in 2-D) or surfaces (in 3-D) appear implicitly. For example, in the 2-D mesh shown in FIG. 11, any contiguous sequence of linear edges of triangles represents a curve. In a 3-D tetrahedral mesh, any union of contiguous triangular faces of tetrahedra represents a surface. Of course, most such curves or surfaces are not interesting, because they are not aligned with image features.

Figure 12:
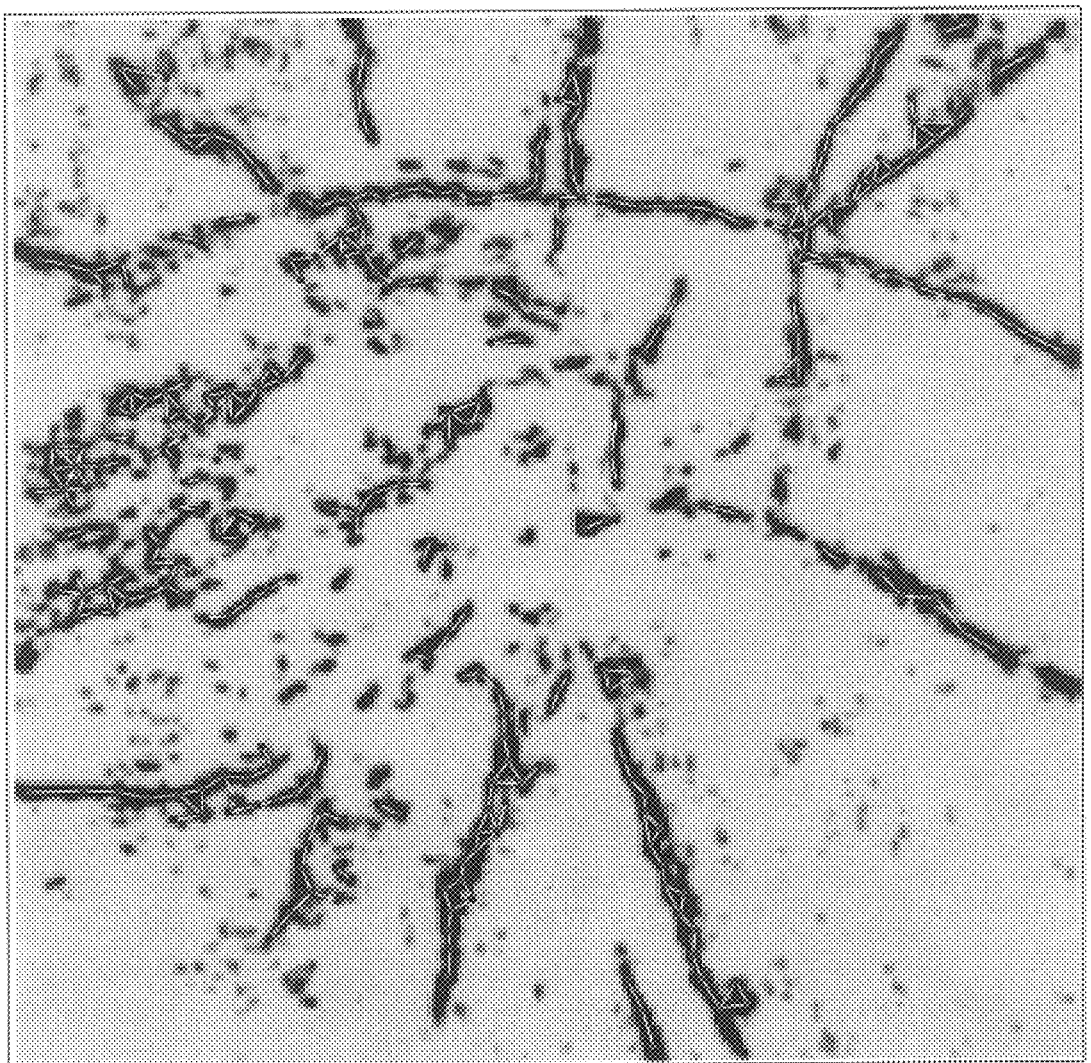
FIG. 12: edges in the mesh that are most aligned with features in the seismic image.

FIG. 12 highlights those edges of triangles that appear to be most aligned with faults in the seismic image. The edges shown here were chosen simply because all image sample values beneath them were below a specified threshold (−0.2). No attempt was made to force connections among individual edges. Nevertheless, many edges are connected and do form continuous curves.

A space-filling mesh facilitates more elaborate curve or surface extraction algorithms than the simple thresholding used in this example. As one consequence of this invention, we anticipate the development of new extraction algorithms. In contrast to extraction (or segmentation) algorithms commonly used today, these new algorithms will produce curves or surfaces guaranteed to be consistent with a space-filling mesh.

Alternative Lattices and Meshes

In the preceding examples, the image potential field was defined so that atoms are attracted to image features. In some situations, it is desirable to create a pseudo-regular lattice in which atoms are repelled from image features.

Figure 13:
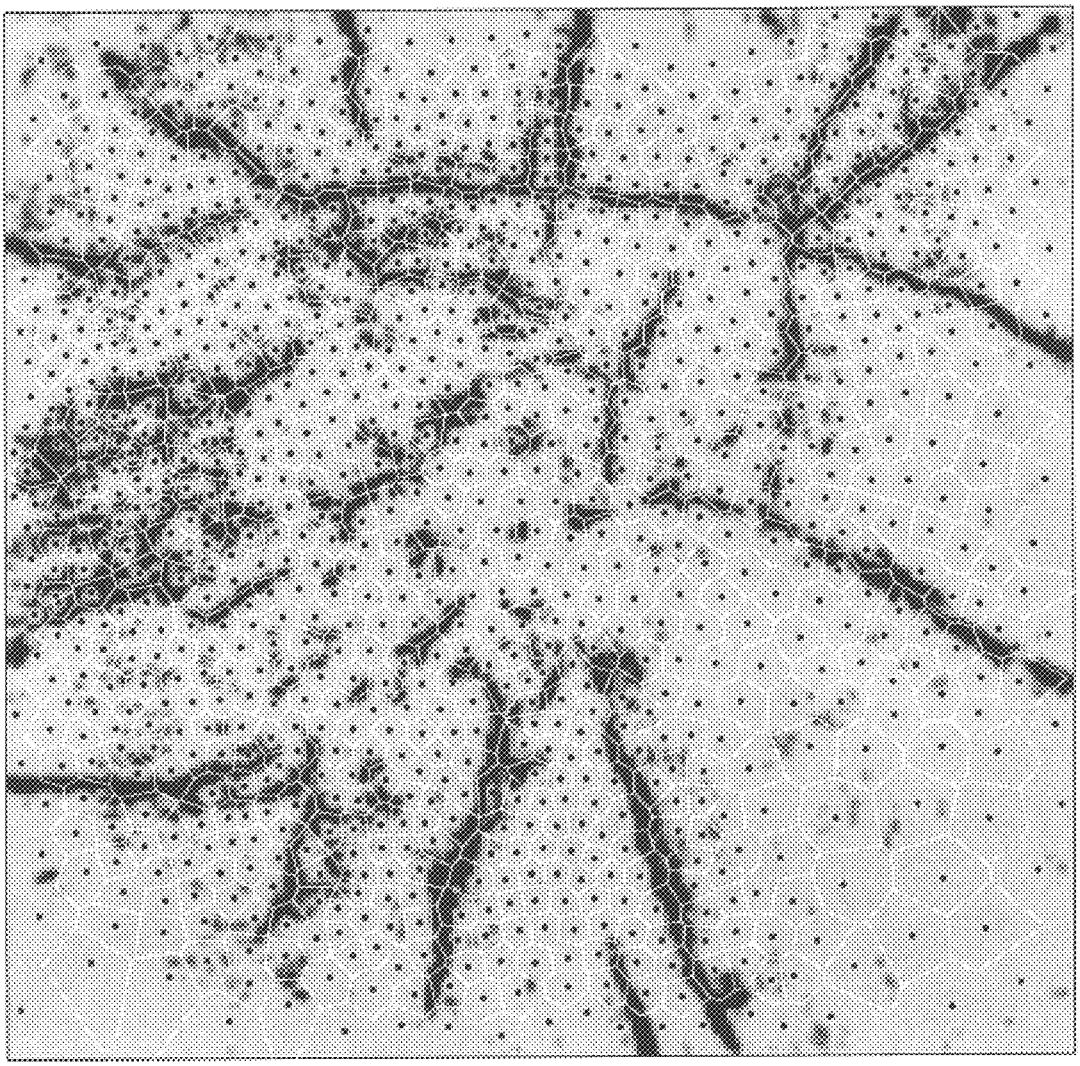
FIG. 13: a Voronoi mesh corresponding to an optimized lattice in which atoms are are repelled by features in the seismic image.

Such a lattice may be obtained using the optimization Algorithm 5 with the same atomic potential function but with an image potential field that attains a maximum value (e.g. one) along image features and a mininum value (e.g. zero) away from image features. FIG. 13 illustrates the result of such an optimization for the seismic image. Atoms in this optimized lattice tend to line up alongside (not on) image features.

FIG. 13 also illustrates a Voronoi mesh generated from the optimized lattice. The Voronoi mesh is the dual of the Delaunay triangulation. Thus, atoms lie within mesh elements rather than at the vertices of mesh elements. Because atoms in the optimized lattice tend to line up alongside image features, the boundaries of Voronoi mesh elements tend to line up on those features.

Voronoi meshes have numerous applications, including the simulation of fluid flow. Often, Voronoi meshes lead to finite-difference solutions to partial differential equations, whereas simplicial triangular/tetrahedral meshes lead to finite-element solutions. Both types of solutions are widely used today. In both types, it is desirable to have mesh element boundaries align with image features, because those features often correspond to discontinuities in physical properties.

More generally, it may be desirable to create a pseudo-regular lattice of atoms that are attracted to certain features in an image, and repelled from other features. For example, it may be advantageous to place communication transceivers in a regular pattern whose local density corresponds to human population density. It may also be desirable for those same transceivers to be located in areas of high elevation (e.g., tops of mountain ridges) and to avoid areas of low elevation (e.g., canyons or river valleys). Thus, an image potential field may include maxima and minima, as well as intermediate plateaus.

ADDITIONAL EXAMPLES

Figure 14:
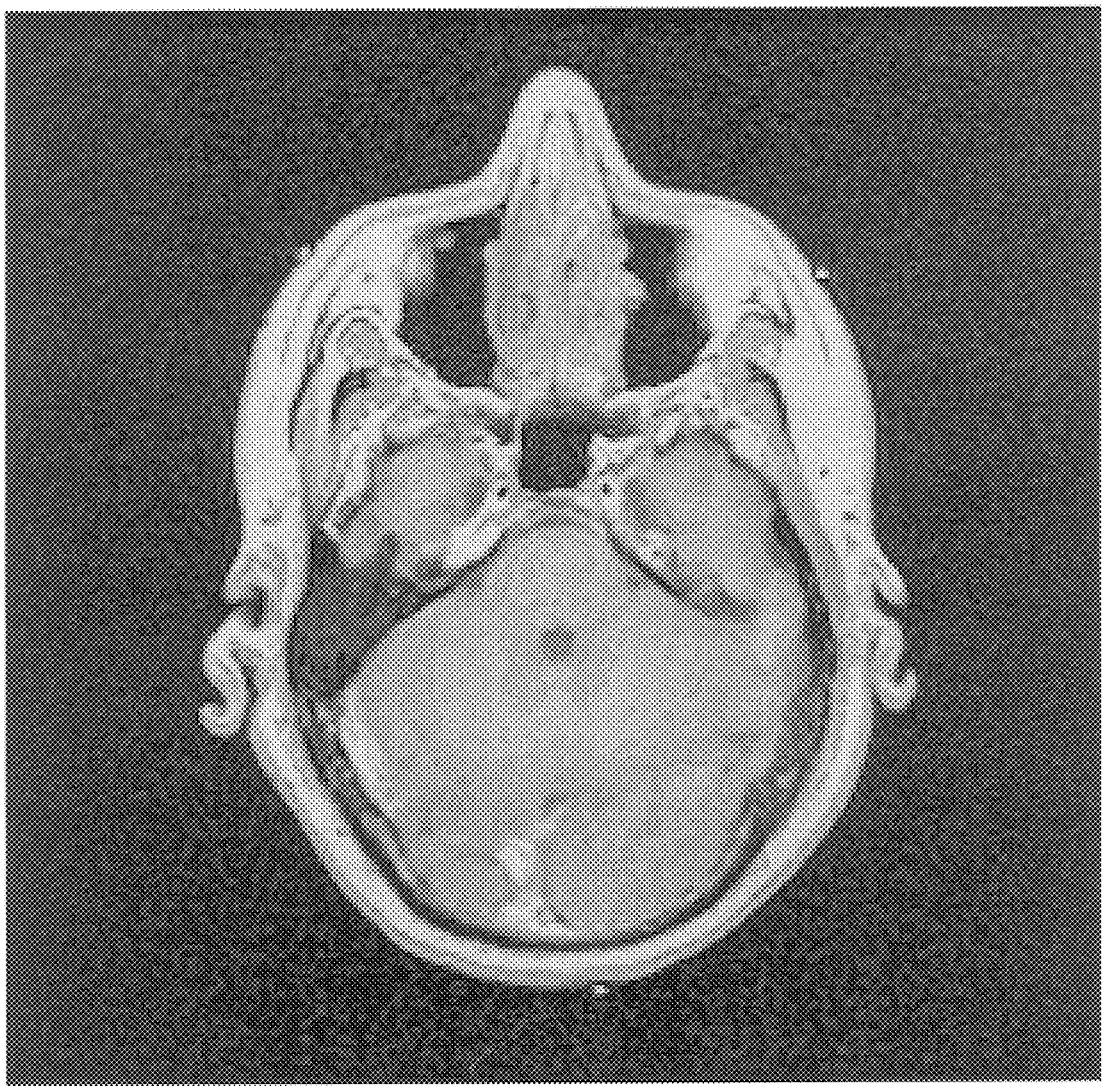
FIG. 14: a magnetic resonance image (MRI) of a human head.

The method of this invention may also be applied to medical images. FIG. 14 shows a magnetic resonance image (MRI) of a human head. This digital image is freely available from the National Library of Medicine, as part of the Visual Human Project.

Figure 15:
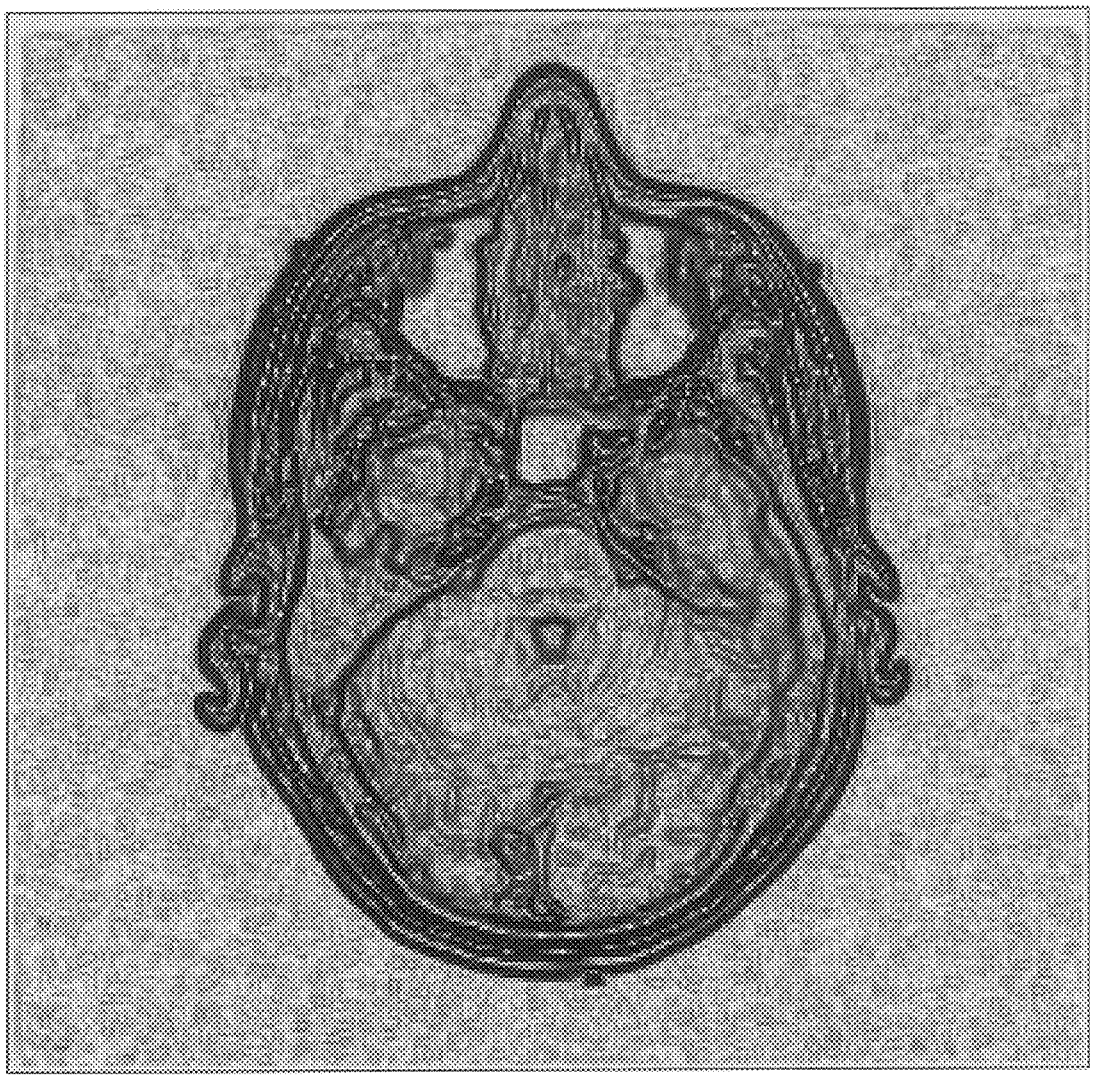
FIG. 15: an image of a human head, processed to enhance edge features.

FIG. 15 shows the image after processing to enhance edges, discontinuities in the original MRI. A simple and well-known Prewitt edge enhancement algorithm was used. This edge-enhanced image may be used as the image potential field $b(x)$ in the method of this invention.

Figure 16:
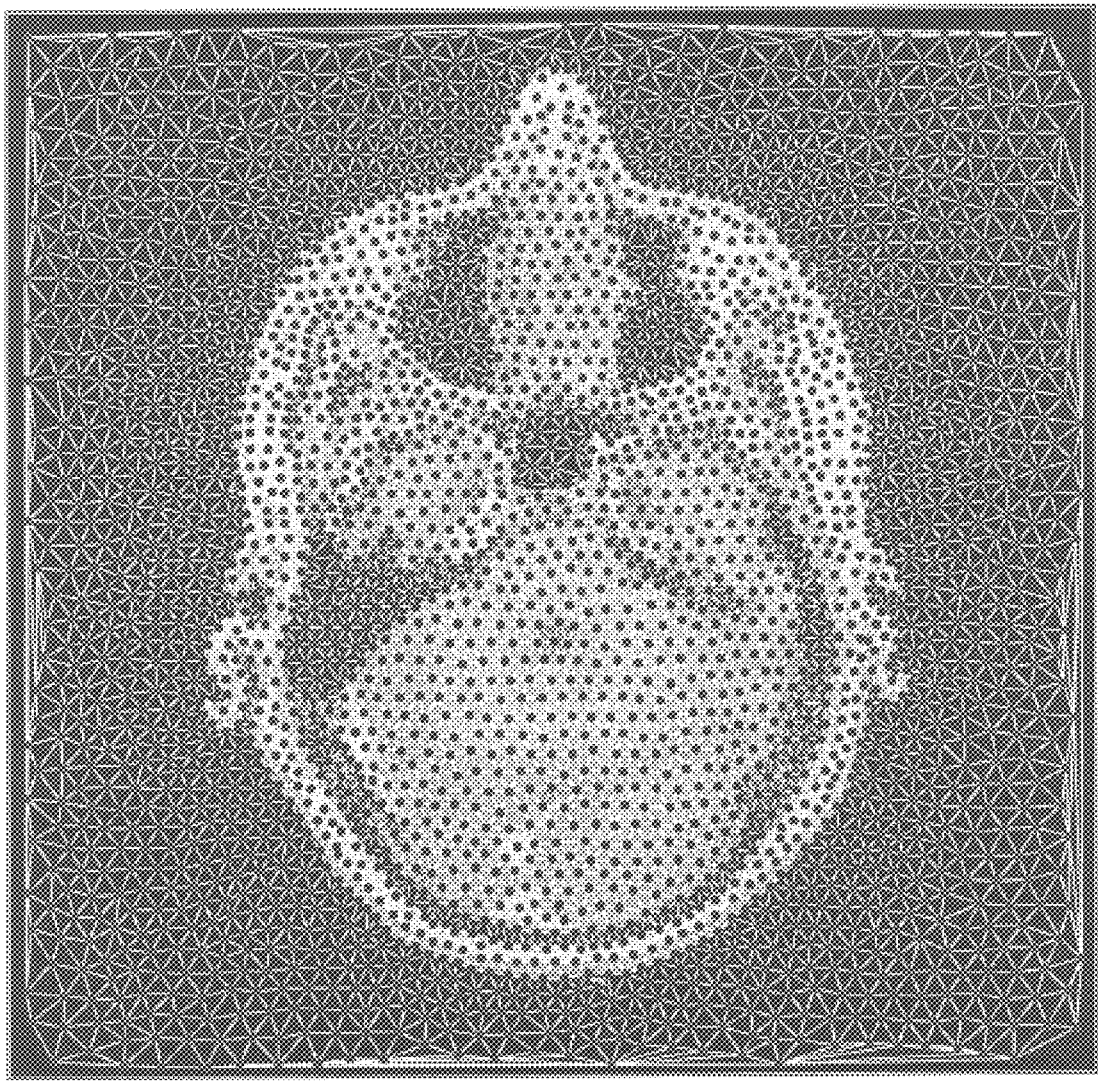
FIG. 16: a mesh aligned with features in the image of a human head.

FIG. 16 shows a mesh optimized for alignment with the image of FIG. 15. As for the seismic image, a non-constant nominal distance function $d(x)$ was computed by smoothing the image. Nominal distance values range from a minimum of $d=4$ to a maximum of $d=12$. The image scale factor is $\beta=0.4$.

Figure 17:
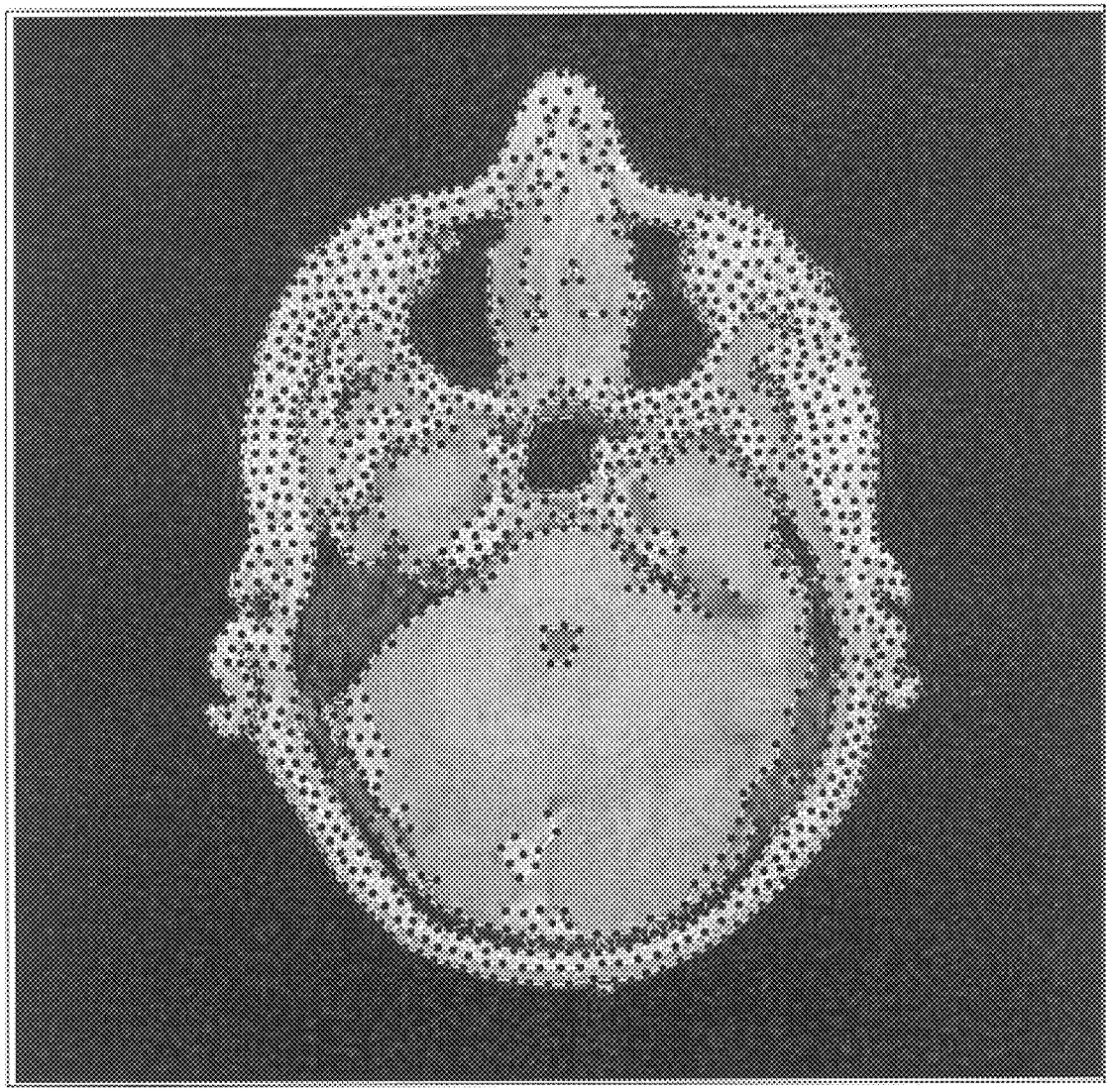
FIG. 17: edges in the mesh that are most aligned with features in the image of a human head.
Figure 18:
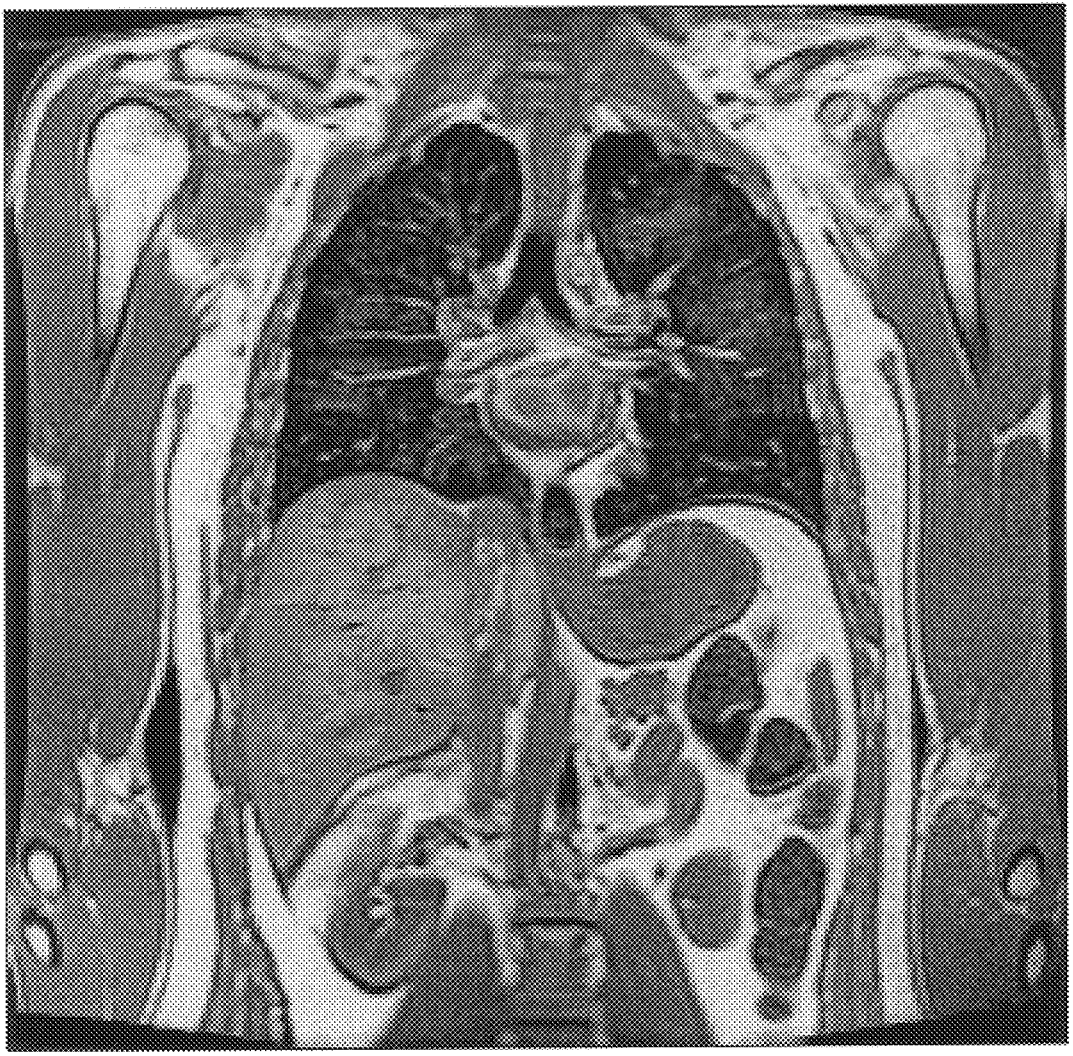
FIG. 18: a magnetic resonance image (MRI) of a human torso.
Figure 19:
FIG. 19: an image of a human torso, processed to enhance edge features.
Figure 20:
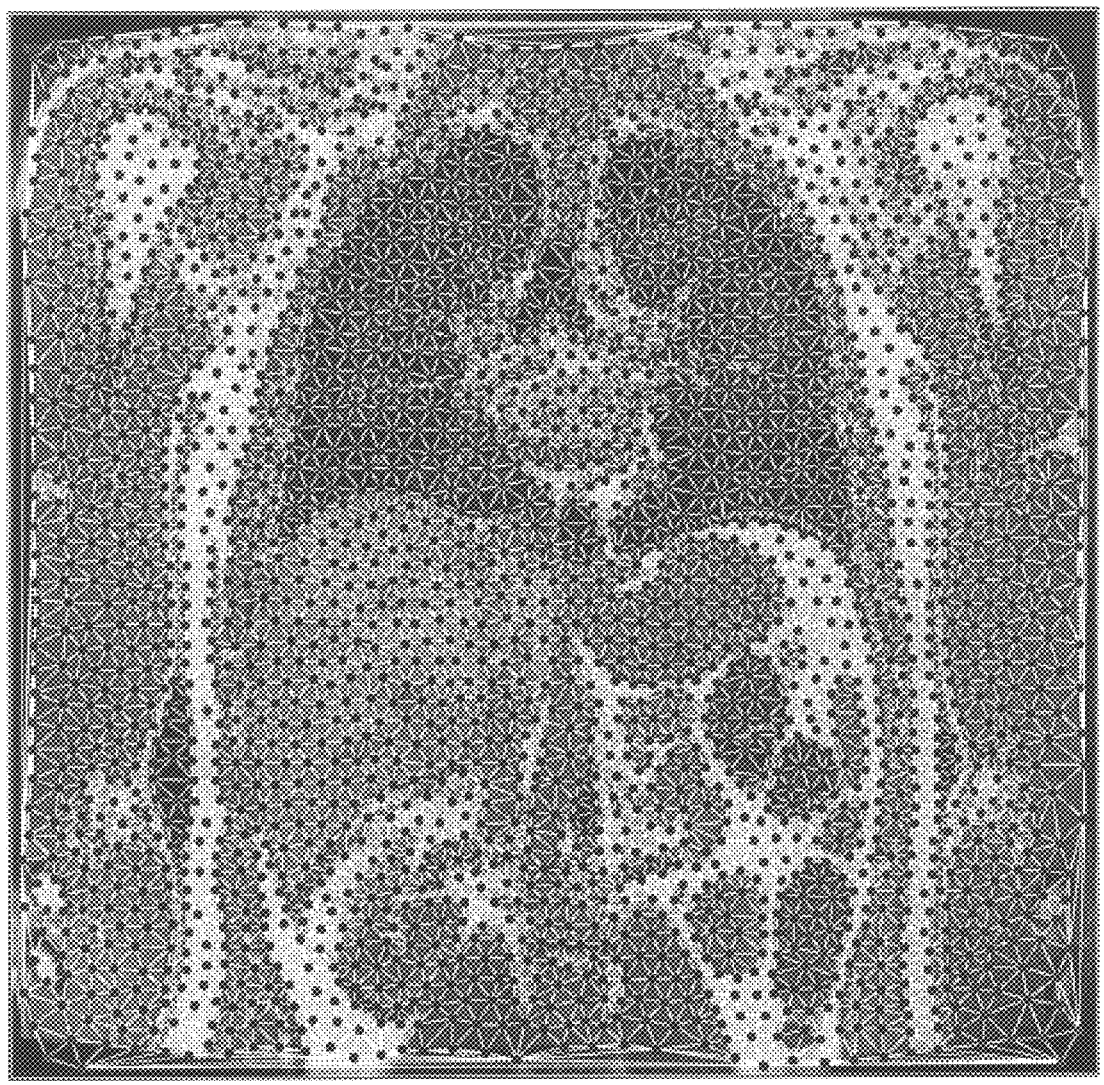
FIG. 20: a mesh aligned with features in the image of a human torso.
Figure 21:
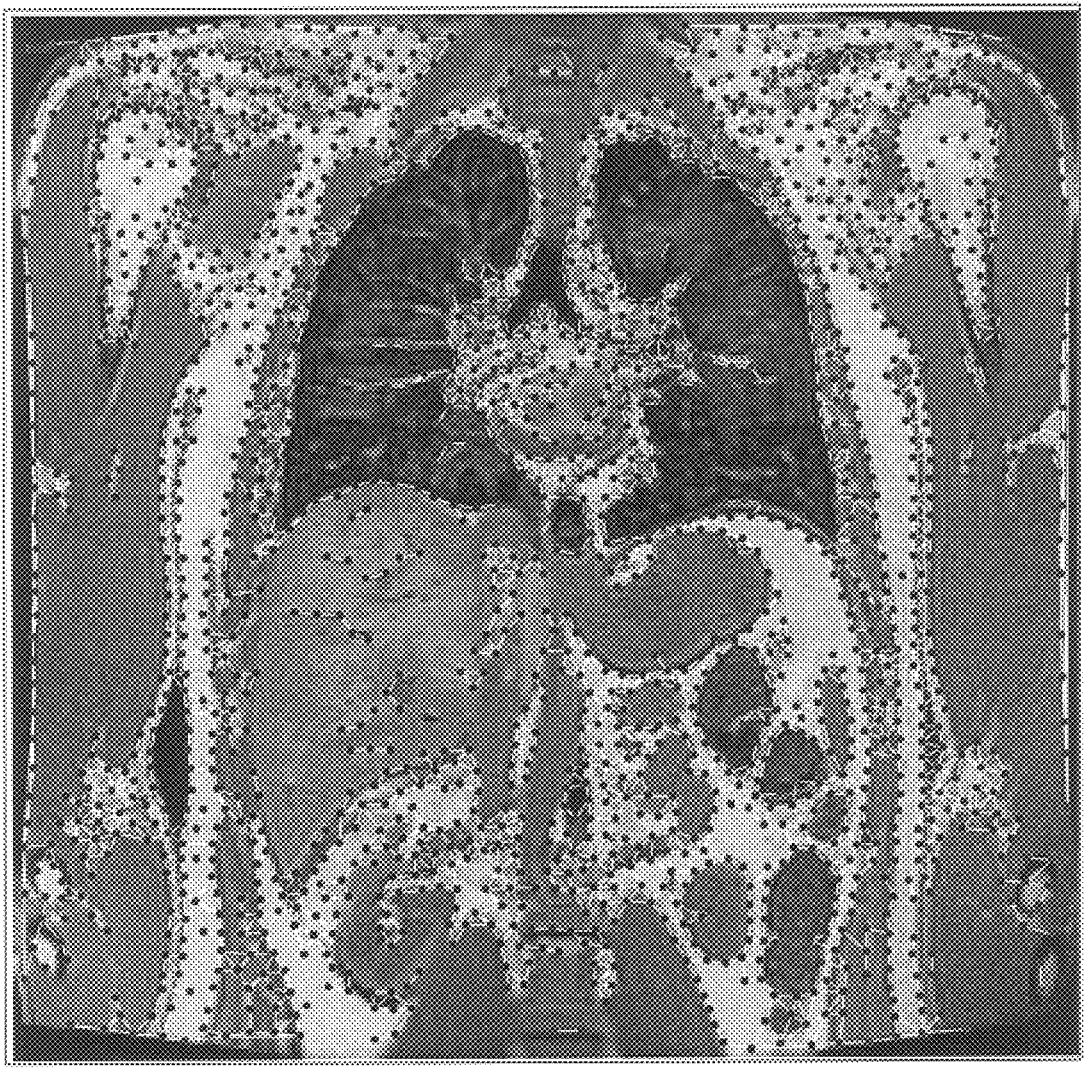
FIG. 21: edges in the mesh that are most aligned with features in the image of a human torso.

FIG. 17 highlights line segments in the mesh that are most aligned with edges in the image. The segments shown were selected using the same simple thresholding algorithm that was used for the seismic image.

FIGS. 18, 19, 20, and 21 provide another example from medical imaging. Like the image of the head, this image of a human torso is freely available from the National Library of Medicine. Image processing and lattice optimization for this image is identical to that for the head image, except that nominal distance values here range from a minimum of $d=5$ to a maximum of $d=15$.

Computer Systems, Memory Media and a Method Embodiment

It is noted that the method of the present invention for generating pseudo-regular lattices which respect features in a digital image may be implemented on any of a variety of computer systems such as desktop computers, minicomputers, workstations, multiprocessor systems, parallel processors of various kinds, distributed computing networks, etc. The method of the present invention may be realized in one or more software programs or modules which are stored onto any of a variety of memory media such as CD-ROM, magnetic disk, bubble memory, semiconductor memory (e.g. any of various types of RAM or ROM). Furthermore, these one or more software programs and/or the results they generate may be transmitted over any of a variety of carrier media such as optical fiber, metallic wire, free space and/or through any of a variety of networks such as the Internet and/or the PSTN (public switched telephone network).

Figure 22:
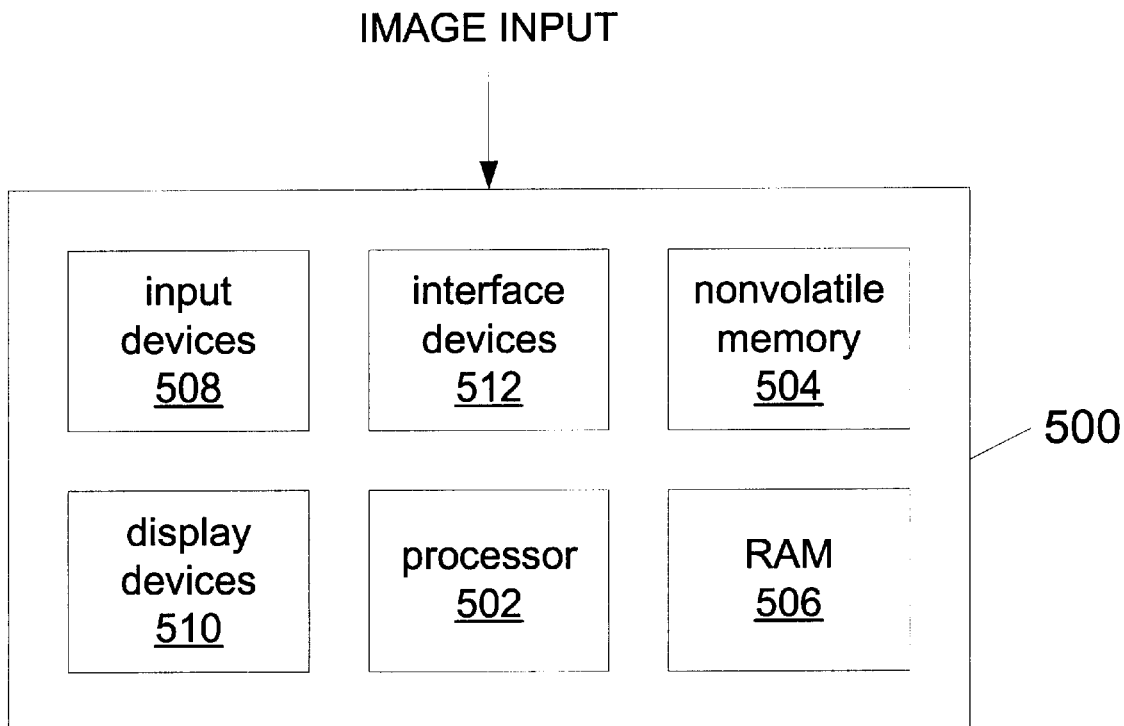
FIG. 22: components of a computational device used to implement the method of this invention.

FIG. 22 illustrates one embodiment 500 of a computer system operable to perform the lattice generation method of the present invention. Computer system 500 may include a processor 502, memory (e.g. random access memory 506 and/or nonvolatile memory devices 504), one or more input devices 508, one or more display devices 510, and one or more interface devices 512. These component subsystems may be interconnected according to any of a variety of configurations. Nonvolatile memory devices 504 may include devices such as tape drives, disk drives, semiconductor ROM or EEPROM, etc. Input devices 508 may include devices such as a keyboard, mouse, digitizing pad, trackball, touch-sensitive pad and/or light pen. Display devices 510 may include devices such as monitors, projectors, head-mounted displays, etc. Interface devices 512 may be configured to acquire digital image data from one or more acquisition devices and/or from one or more remote computers or storage devices through a network.

Any of a variety of acquisition devices may be used depending on the type of object or process being imaged. The one or more acquisition devices may sense any of various forms of mechanical energy (e.g. acoustic energy, displacement and/or stress/strain) and/or electromagnetic energy (e.g. light energy, radio wave energy, current and/or voltage).

Processor 502 may be configured to read program instructions and/or data from RAM 506 and/or nonvolatile memory devices 504, and to store computational results into RAM 506 and/or nonvolatile memory devices 504. The program instructions direct processor 502 to operate on an input image based on any combination of the method embodiments described herein. The input image may be provided to computer system 500 through any of a variety of mechanisms. For example, the input image may be acquired into nonvolatile memory 504 and/or RAM 506 using the one or more interface devices 512. As another example, the input image may be supplied to computer system 500 through a memory medium such as disk or tape which is loaded into/onto one of the nonvolatile memory devices 504. In this case, the input image will have been previously recorded onto the memory medium by computer system 500 or by some other computer system.

It is noted that the input image may not necessarily be raw sensor data obtained by an acquisition device. For example, the input image may be the result of one or more preprocessing operations on a set of raw sensor data. The one or more preprocessing operations may be performed by computer system 500 and/or one or more other computers. Furthermore, the input image may be completely independent of sensor data as in the case of an image generated by a designer using a CAD package.

Figure 23:
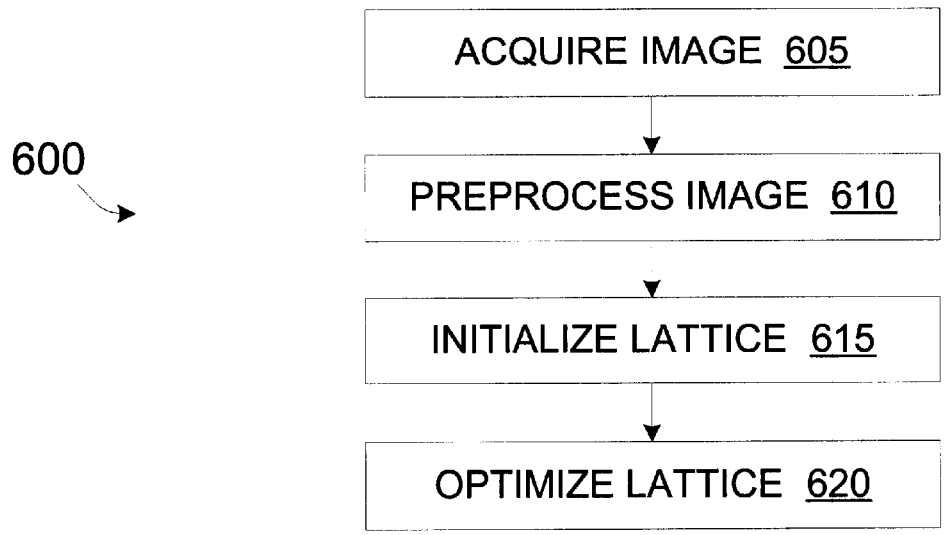
FIG. 23: an embodiment of the method of this invention.

FIG. 23 illustrates one embodiment 600 of a method for generating a lattice of points that is pseudo-regular and that respects features in a digital image. In step 605, an image (e.g. an image of an object and/or process) may be acquired into a locally accessible memory such as nonvolatile memory 504 and/or RAM 506 of computer system 500. In step 610, the image may be preprocessed to enhance or reveal features of interest in the image. If the features of interest are sufficiently clear in the image as acquired in step 605, step 610 may be omitted. (As mentioned above, the image as acquired in step 605 may have already been subjected to preprocessing operations.)

The present invention contemplates the use of any desired processing technique or combination of techniques for the preprocessing of step 610. For example, the image may be subjected to edge detection, convolution filtering, Fourier transformation, non-linear filtering, thresholding, etc. The preprocessing may generate the image potential field sampled like the digital image. Furthermore, the preprocessing may operate on the image to generate the nominal distance function d(x). The preprocessing may be automated or may be responsive to user inputs. For example, a user may highlight features and/or regions of interest in the image.

In step 615, a lattice of points consistent with the nominal distance function d (x) may be intialized in the space spanned by the image. The lattice may be initialized by the methods of Algorithm 3 or Algorithm 4. In one alternative embodiment, the initial lattice consistent with the nominal distance function may be generated from a cheap lattice such as a rectangular lattice or equilateral lattice by executing a number of iterations of the lattice optimization with scaling parameter $\beta$ equal to zero. However, to avoid tearing of the lattice, the distance between atoms in the cheap lattice may be set equal to the minimum of the nominal distance function. In another alternative embodiment, the initial lattice may be generated from a cheap lattice by executing a number of iterations of the lattice optimization with a nonzero value for the scaling parameter $\beta$, and with the distance function d(x) replacing the image potential field b(x).

In step 620, the initial lattice of points may be optimized by Algorithm 5. The optimized lattice of points may be used in any of a variety of applications. For example, the lattice may be triangulated to generate a space-filling mesh, and the mesh may be used to execute a mesh-based simulation (such as a reservoir simulation), image coding algorithm, signal analysis method, etc. In some embodiments, the optimized lattice may be used by an application without the intervening step of generating a mesh.

Conclusion, Ramifications, and Scope

The examples provided above demonstrate the utility of the method of this invention in generating a lattice of points that is both pseudo-regular and responsive to features in a digital image. The optimized lattice may have variable density, conforming to a spacially-varying level of detail in the image.

The examples have also shown that triangulation of such a lattice may yield a space-filling mesh that is well aligned with image features. The highly regular elements in this mesh make it a suitable framework for subsequent computations, such as the simulation of fluid flow.

Our combination of a lattice framework and an image may be used as the basis for improved algorithms for feature extraction.

Although the examples shown above exhibit 2-D images, the method of this invention applies equally well to 3-D images. Where necessary, differences between 2-D and 3-D equations and algorithms have been highlighted in their descriptions. The method of the present invention naturally generalizes to N-dimensional images, where N is any integer greater than zero.

The images in the examples were uniformly sampled on a rectangular 2-D grid. However, various embodiments are contemplated where the method operates with alternate image topologies. For example, a 2-D image may be sampled on the surface of a sphere. Thus, in one embodiment, the method of the present invention may generate a pseudo-regular lattice of points on such a spherical surface, consistent with a distance function defined on that surface, and then aligned with image features displayed on that surface. A variety of topologies in various dimensions are contemplated.

The method of this invention has been presented in terms of a minimization problem. It is an obvious mathematical fact that the minimization of a function $f$ is equivalent to maximizing its negative $-f$. Thus, alternative embodiments are contemplated where the lattice optimization operates by maximizing a composite function comprising a combination of a first function of inter-atomic distances between points (i.e. atoms) in a lattice and a second function of positions of the lattice points.

Although the description above contains many specific details, these should not be construed as limiting the scope of the invention. Rather, they merely provide illustrations of currently preferred embodiments of this invention. For example, the simple polynomial pair-wise potential function could be replaced with another function having similar properties. Likewise, a variety of algorithms may be used to initialize a lattice of atoms, in addition to the two algorithms presented above.

Thus the scope of this invention should be determined by the appended claims and their legal equivalents, rather than by the examples of embodiments provided above.

What is claimed is:

1. A computer-implemented method for generating an N-dimensional lattice of points that respects features in an N-dimensional digital image, where N is an integer greater than zero, the method comprising:

initializing said lattice of said points in a subset of space sampled by said image;

optimizing said lattice by moving said points to extremize a composite function of spatial coordinates of said points;

wherein said composite function is a weighted combination of a first function of pair-wise distances between said points, and a second function of sampled values of said image near said points;

wherein the first function is a summation of terms, wherein each of said terms corresponds to exactly one of said pair-wise distances between said points; and wherein said optimized lattice of points is usable to generate a mesh for simulation of a process associated with said image.

2. The method of claim 1, whereby weights in said weighted combination are chosen to balance a desired extent of regularity of said lattice with a desired extent of responsivity of said lattice to said features in said image.

3. The method of claim 1 further comprising generating a space-filling mesh from the lattice of points.

4. The method of claim 3, wherein the mesh comprises N-dimensional mesh elements, the method further comprising identifying a union of boundaries of a subset of said mesh elements, and wherein said union of boundaries corresponds to a boundary between regions of interest in said image.

5. The method of claim 1, wherein said initializing employs a distance function that specifies, for each point in said lattice, a preferred distance from said point in said lattice to other points in said lattice nearby said point.

6. The method of claim 5, wherein said initializing the lattice of points comprises:
   reading a first tentative lattice point from a queue;
   examining a first neighborhood around said first tentative lattice point to determine if none of the lattice points in a current state of the lattice is contained in the first neighborhood; and
   if the first neighborhood contains none of the lattice points in the current state of the lattice, executing an update operation comprising:
      adding the first tentative lattice point to the lattice, and appending new tentative lattice points to the queue, wherein said new tentative lattice points are assigned coordinate positions corresponding to an exactly regular lattice with respect to the first tentative lattice point and the distance function.

7. The method of claim 6 further comprising:
   storing one or more seed points on the queue; and
   repeatedly perfoming said reading, examining and conditionally executing the update operation until the subset of said space is filled.

8. The method of claim 5, wherein said initializing the lattice of points comprises randomly adding points to said lattice at positions sampled by said image, and wherein a probability of adding a point to said lattice at one of said sampled positions is determined by the distance function evaluated at said one sampled position.

9. The method of claim 1, wherein said optimizing the lattice of said points comprises computing a value of the first function, wherein said computing the value of the first function comprises:
   evaluating a functional form at image sample positions in a neighborhood of a lattice point to obtain local function values;
   adding the local function values to corresponding samples in an array representing an atomic potential field;
   repeatedly performing said evaluating and said adding for each of the lattice points;
   computing an atomic potential field value corresponding to each of the lattice points, based on one or more samples in the array representing the atomic potential field; and
   adding the atomic potential field value for each the lattice points to determine the value of the first function.

10. The method of claim 9, wherein the functional form comprises a function of distance from the lattice point divided by a nominal distance function evaluated in the neighborhood of the lattice point.

11. The method of claim 1, wherein said optimizing the lattice of said points further comprises computing derivatives of said composite function with respect to each of said spatial coordinates of said points, and determining an updated set of values for said spatial coordinates of said points based on said derivatives.

12. The method of claim 1, wherein the image attains a minimal value along at least a subset of said features in said image.

13. The method of claim 1, wherein the image attains a maximal value along at least a subset of said features in said image.

14. A computer-implemented method for generating a representation of an object for simulation, the method comprising:
   obtaining an image of the object;
   initializing a lattice of points in a space sampled by the image; and
   adjusting locations of the points in the space one or more times to extremize a composite function of spatial coordinates of the points;
   wherein the composite function is a weighted combination of a first function of pair-wise distances between the points, and a second function of sampled values of said image near the points;
   wherein the first function is a summation of terms, wherein each of said terms corresponds to exactly one of said pair-wise distances between said points; and
   wherein said adjusting locations one or more times produces a final lattice of points that is usable to generate a mesh for simulation of a process associated with said object.

15. The method of claim 14, wherein said object comprises an underground reservoir of one or more fluids, and wherein the simulation comprises a simulation of the flow of said fluids based on said mesh.

16. The method of claim 14, wherein one of said pair-wise distances corresponds to one pair of said lattice points, and wherein the pair-wise distance comprises a ratio of (a) a distance between the points in the pair of lattice points and (b) a value of a nominal distance function evaluated in the neighborhood of the pair of lattice points.

17. A computer-implemented method for generating a lattice from an image, the method comprising:
   initializing a lattice of points in at least a portion of a space sampled by the image; and
   adjusting locations of points in the lattice of points in the space one or more times to converge towards an extremum of a total potential energy, wherein said total potential energy comprises a combination of an atomic potential energy of the lattice and an image potential energy of the lattice;
   wherein the image potential energy is computed from the image and the locations of the lattice points; and
   wherein said adjusting locations one or more times produces a final lattice of points that is usable to encode information associated with the image.

18. The method of claim 17, wherein the image potential energy comprises a sum of image potential field values, and wherein each of said image potential field values corresponds to an evaluation of an image potential field at one of the lattice points.

19. The method of claim 18, wherein the image includes features of interest, the method further comprising generating the image potential field by processing the image so that the image potential field attains a first potential value along one or more of said features of interest and a second potential value away from from said features of interest.

20. The method of claim 19, wherein the first potential value is a maximum potential value.

21. The method of claim 19, wherein the first potential value is a minimum potential value.

22. The method of claim 17, wherein the atomic potential energy comprises a sum of atomic potentials for pairs of said lattice points.

23. The method of claim 22, wherein the atomic potential for one of said pairs of said lattice points is a function of normalized distance between the points in the pair, and wherein the normalized distance equals the ratio of an unnormalized distance between the points in the pair and a local value of a nominal distance function.

24. The method of claim 23 further comprising:
smoothing the image to generate a smoothed image; and
assigning values to the nominal distance function based on values of the smoothed image.

25. The method of claim 17, further comprising generating a mesh from the final lattice of points, wherein the mesh is usable to encode information associated with the image.

26. The method of claim 25, further comprising performing a simulation of a physical process using the mesh.

27. The method of claim 17, wherein said combination comprises a linear combination $\alpha A + \beta B$, where A is the atomic potential energy, wherein B is the image potential energy, and wherein coefficients $\alpha$ and $\beta$ control an extent of positional sensitivity of said lattice of points with respect to features in the image and an extent of regularity of said lattice of points.

28. The method of claim 17 further comprising:
acquiring a series of images; and
performing said initializing and adjusting on each of said images in said series to generate a corresponding series of final lattices.

29. The method of claim 17 further comprising:
acquiring subsequent images;
encoding differences in the subsequent images using the final lattice of points to generate image codes; and
transmitting the image codes onto a transmission medium.

30. A computer-implemented method for determining a lattice of points suitable for a simulation, the method comprising:
operating on an image to generate an image potential field, wherein said image potential field attains an extremal potential value along features of interest in said image;
initializing the lattice of points in a region of space corresponding to said image; and
repeatedly adjusting locations of said lattice of points in said region to extremize a total potential energy,
wherein said total potential energy comprises a combination of an atomic potential energy and an image potential energy,
wherein the atomic potential energy comprises a sum of atomic potentials for pairs of said lattice points,
wherein the image potential energy comprises a sum of image potentials, and
wherein each of said image potentials corresponds to an evaluation of the image potential field at one of the lattice points.

31. The method of claim 30, wherein said operating on the first image to generate the image potential field comprises detecting edges in said first image, and wherein said features of interest comprise edges in said first image.

32. The method of claim 30, wherein said operating on said image to generate the image potential field comprises:
identifying features of interest in the image;
assigning a first constant value to the image potential field at first spatial locations corresponding to at least a subset of said features of interest; and
assigning a second constant value to the image potential field at second spatial locations not corresponding to said features of interest.

33. The method of claim 32, wherein said first constant value is a maximum value of said image potential field.

34. The method of claim 32, wherein said first constant value is a minimum value of said image potential field.

35. The method of claim 32, wherein said operating on said image to generate the image potential field further comprises smoothing a first version of the image potential field, generated by said assigning the first constant value and the second constant value, to obtain a second version of the image potential field.

36. The method of claim 35, wherein said second version of the image potential field is used to compute the image potentials for a first set of repetitions of said repeatedly adjusting locations, and wherein said first version of the image potential function is used to compute the atomic image potentials for a second set of repetitions of said repeatedly adjusting locations.

37. The method of claim 30 further comprising:
randomly displacing the locations of said lattice of points in said space; and
performing multiple iterations of said randomly displacing and said repeatedly adjusting to obtain a succession of local extrema of the total potential energy.

38. The method of claim 30, wherein said initializing employs a distance function that specifies a preferred distance from each point in said lattice to other points nearby said point, and wherein said preferred distance is a function of location in said region.

39. The method of claim 38, wherein said initializing the lattice of points in the region of space comprises:
reading a first tentative lattice point from a queue;
examining a first neighborhood around said first tentative lattice point to determine if the first neighborhood contains no points of said lattice; and
if the first neighborhood contains no points of said lattice, executing an update operation comprising:
adding the first tentative lattice point to the lattice, and
appending new tentative lattice points to the queue, wherein said new tentative lattice points are assigned coordinate positions corresponding to an exactly regular lattice with respect to the first tentative lattice point and the distance function.

40. The method of claim 39 further comprising:
storing one or more seed points on the queue; and
repeatedly perfoming said reading, examining and conditionally executing the update operation until the subset of said space is filled.

41. The method of claim 39 wherein the first neighborhood around said first tentative lattice point is an N-dimensional ball with diameter proportional to the distance function evaluated at the first tentative lattice point, wherein N is the dimension of said space corresponding to said image.

42. The method of claim 30, wherein said initializing the lattice of points in the region of space comprises:
computing a local probability value at a candidate position in the region based on a distance function;
generating a random number value;
determining if the random number value satisfies an inequality condition with respect to the local probability value; and
conditionally adding the candidate position to the lattice of points if the random number value satisfies the inequality condition with respect to the local probability value.

43. The method of claim 42, wherein said initializing the lattice of points further comprises:

moving the candidate position through a set of image positions sampled by said first image; and performing said computing, generating, determining and conditionally adding for each of said image positions.

44. The method of claim 30, wherein the combination is of the form $(1-\beta)A+\beta B$, wherein A is the atomic potential energy, B is the image potential energy, and wherein parameter $\beta$ takes any value in the range from zero to one inclusive.

45. The method of claim 30 further comprising triangulating the lattice of points to generate a mesh from the lattice of points, wherein said mesh comprises a union of mesh elements, and wherein the vertices of the mesh elements are the lattice points.

46. The method of claim 45, wherein said triangulating the lattice of points comprises performing a Delaunay triangulation of the lattice of points.

47. The method of claim 45 further comprising identifying a union of boundaries of said mesh elements which approximates one or more of said features of interest.

48. The method of claim 45 further comprising performing a simulation on the mesh, wherein the simulation generates output representing a behavior of a physical system.

49. The method of claim 48, wherein the physical system comprises an underground reservoir comprising one or more fluids.

50. A computer system configured to determine a lattice of points suitable for a simulation, the computer system comprising:

a processor;

a memory coupled to said processor and configured to store program instructions; and an input port for providing an image to said memory;

wherein said processor is configured to read and execute the program instructions from said memory, wherein, in response to said execution of the program instructions, the processor is operable to:

operate on the image to generate an image potential field, wherein said image potential field attains one or more extreme potential values along features of interest in said image;

initialize the lattice of points in a region of space corresponding to said image; and repeatedly adjust locations of said lattice of points in said region to extremize a total potential energy, wherein said total potential energy comprises a combination of an atomic potential energy and an image potential energy, wherein the atomic potential energy comprises a sum of atomic potentials for pairs of said lattice points, wherein the image potential energy comprises a sum of image potentials, and wherein each of said image potentials corresponds to an evaluation of the image potential field at one of the lattice points.

51. A computer-readable memory medium configured to store program instructions, wherein the program instructions are executable to implement:

initializing a lattice of points in a subset of space sampled by an image; and optimizing said lattice by moving said points to extremize a composite function of the spatial coordinates of said points;

wherein said composite function is a weighted combination of a first function of pair-wise distances between said points, and a second function of sampled values of said image near said points;

wherein the first function is a summation of terms, wherein each of said terms corresponds to exactly one of said pair-wise distances between said points; and wherein said optimized lattice of points is usable to generate a mesh for simulation of a process associated with said image.

52. The memory medium of claim 51, wherein the program instructions are further executable to generate a space-filling mesh from the lattice of points.

53. The memory medium of claim 52, wherein the mesh comprises N-dimensional mesh elements, wherein the program instructions are further executable to identify a union of boundaries of a subset of said mesh elements, and wherein said union of boundaries corresponds to a boundary between regions of interest in said image.

54. The memory medium of claim 51, wherein said initializing employs a distance function that specifies a preferred distance from each point in said lattice to other points nearby said point, and wherein said preferred distance is a function of location in said space.

55. The memory medium of claim 54, wherein said initializing the lattice of points comprises:

reading a first tentative lattice point from a queue;

examining a first neighborhood around said first tentative lattice point to determine if the first neighborhood contains no points of said lattice; and if the first neighborhood contains no points of said lattice, executing an update operation comprising:
adding the first tentative lattice point to the lattice, and
appending new tentative lattice points to the queue, wherein said new tentative lattice points are assigned coordinate positions corresponding to an exactly regular lattice with respect to the first tentative lattice point and the distance function.

56. The memory medium of claim 54, wherein said initializing the lattice of points comprises randomly adding points to said lattice at positions sampled by said image, and wherein a probability of adding a point to said lattice at one of said sampled positions is determined by the distance function evaluated at said one of said sampled positions.

57. The memory medium of claim 51, wherein said optimizing the lattice of said points comprises repeatedly computing a value of the first function, wherein said computing the value of the first function comprises:

evaluating a functional form at image sample positions in a neighborhood of a lattice point to obtain local function values;

adding the local function values to corresponding samples in an array representing an atomic potential field;

repeatedly performing said evaluating and said adding for each of the lattice points;

computing an atomic potential field value corresponding to each of the lattice points, based on one or more samples in the array representing the atomic potential field; and adding the atomic potential field value for each the lattice points to determine the value of the first function.

58. The memory medium of claim 57, wherein the functional form comprises a function of distance from the lattice point divided by a nominal distance function evaluated in the neighborhood of the lattice point.

* * * * *